(12) United States Patent
Dagenais et al.

(10) Patent No.: US 9,987,894 B2
(45) Date of Patent: Jun. 5, 2018

(54) VEHICLE TRAILER SYSTEM

(71) Applicants: Frederick W. Anton Engelbrecht, Cape Coral, FL (US); Richard Alan Stahl, Englewood, FL (US); Marshall Roy Crosby, Jonesboro, GA (US)

(72) Inventors: Roderick R. Dagenais, Sarasota, FL (US); Richard Alan Stahl, Englewood, FL (US); Marshall Roy Crosby, Jonesboro, GA (US)

(*) Notice: Subject to any disclaimer, the term of this patent is extended or adjusted under 35 U.S.C. 154(b) by 277 days.

(21) Appl. No.: 15/160,343

(22) Filed: May 20, 2016

(65) Prior Publication Data

US 2016/0339824 A1 Nov. 24, 2016

Related U.S. Application Data

(60) Provisional application No. 62/165,926, filed on May 23, 2015.

(51) Int. Cl.
| | |
|---|---|
| B60P 1/32 | (2006.01) |
| B60D 1/52 | (2006.01) |
| B62D 63/06 | (2006.01) |
| B60P 1/64 | (2006.01) |
| B62D 21/20 | (2006.01) |

(52) U.S. Cl.
CPC .............. *B60D 1/52* (2013.01); *B60P 1/6454* (2013.01); *B62D 21/20* (2013.01); *B62D 63/061* (2013.01)

(58) Field of Classification Search
CPC .... B60P 1/645; B60P 1/30; B60P 1/32; B60P 1/34; B60P 1/08; B60P 1/433; B62D 21/20; B62D 63/061

USPC .......... 414/483; 180/199, 203, 8.3; 280/767
See application file for complete search history.

(56) References Cited

U.S. PATENT DOCUMENTS

| | | |
|---|---|---|
| 4,013,184 A | 3/1977 | Lacy |
| 4,629,379 A | 12/1986 | Harris et al. |
| 4,930,799 A | 6/1990 | Pihlstrom et al. |
| 4,958,978 A | 9/1990 | Shedlesk |
| 5,237,784 A | 8/1993 | Ros |
| 5,967,733 A | 10/1999 | Cash |
| 6,164,862 A | 12/2000 | Takaguchi |
| 6,364,584 B1 | 4/2002 | Taylor |
| 6,729,098 B1 | 5/2004 | Brennan, Jr. |
| 7,125,212 B2 | 10/2006 | Moore et al. |
| 7,717,290 B2 | 5/2010 | Gerding |
| 8,166,715 B2 | 5/2012 | De Azambuja |

(Continued)

*Primary Examiner* — Mark C Hageman
(74) *Attorney, Agent, or Firm* — H. John Rizvi; Gold & Rizvi, P.A.

(57) ABSTRACT

A vehicle trailer system for loading, transporting and unloading a load includes a trailer front structure for attachment to a towing vehicle; a pivotable structure pivotally coupled to the trailer front structure and including a transversely-movable structure for a load to slide or roll thereupon. An actuator allows causing transverse movement of the transversely-movable structure relative to a main body of the pivotable structure. A carriage mounted for bidirectional travel on the main body of the pivotable structure, the carriage including a carriage hitch for pivotably coupling a load. The transversely-movable structure in combination with the pivotably coupling carriage hitch allow correcting virtually any misalignments between the cargo container and the trailer, and clearing virtually any obstacle, in such a way that cargo containers will be able to be loaded and unloaded by small vehicles and in practically any location.

18 Claims, 15 Drawing Sheets

(56) References Cited

U.S. PATENT DOCUMENTS

| | | |
|---|---|---|
| 8,550,274 B2 | 10/2013 | Gerding |
| 8,720,126 B2 | 5/2014 | Strickland et al. |
| 8,770,442 B2 | 7/2014 | Cantin et al. |
| 2007/0003398 A1 | 1/2007 | Hernandez |

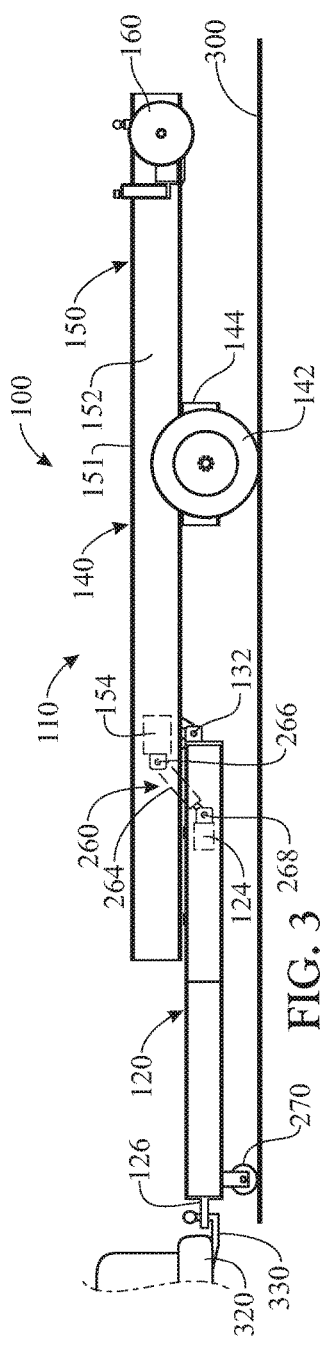
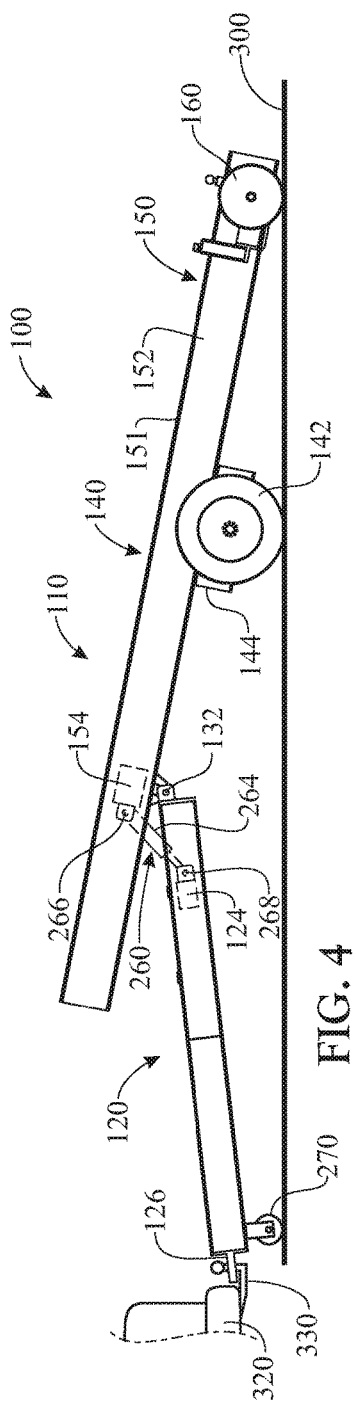
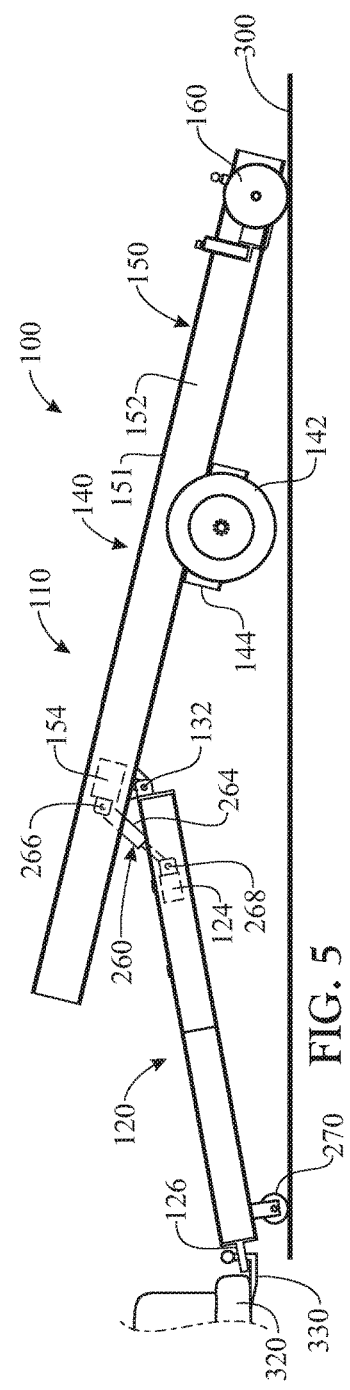
FIG. 3
FIG. 4
FIG. 5

VEHICLE TRAILER SYSTEM

CROSS-REFERENCE TO RELATED APPLICATIONS

This application claims the benefit of U.S. Provisional Patent Application Ser. No. 62/165,926, filed May 23, 2015, which is incorporated herein in its entirety.

FIELD OF THE INVENTION

The present invention relates generally to trailers, and more particularly, to a vehicle trailer system which is suitable for loading, transporting and unloading a load such as a cargo container and which facilitates ease in loading a cargo container onto a trailer.

BACKGROUND OF THE INVENTION

Cargo containers, such as intermodal containers, freight containers, ISO containers, shipping containers, hi-cube containers or the like, are generally metallic structures vastly used to transport items or materials over land via roadways or railways or via sea transportation. In military applications, for example, cargo containers may be used to transport equipment or shelters for various military operations. In civilian applications, cargo containers may be used to transport a variety of different types of equipment or materials. Cargo containers can also be used to temporarily or permanently store objects.

Conventional cargo containers typically include a floor, walls extending from the floor and a roof on the walls. One or more doors may be provided in the walls of the containers. Containers can also typically include fasteners, or fastening portions to which fasteners can be coupled, to allow securing the containers during loading, unloading and transportation. For instance, ISO containers include eight ISO connectors, one at each corner of the container, for attaching ISO compliant fasteners.

Loading and unloading of cargo containers onto or from ships, trains or other means of transportation or storage can be carried out by various means. For instance, vertically lifting cranes can be used to load and unload containers in large vessels or freights. Alternatively, reach stackers can be used for stacking a reduced number of containers, such as onto a train.

Loading and unloading a container onto a truck or other vehicle trailer is also possible. For this purpose, vehicle trailer systems are known in the art comprising a tiltable trailer bed and a winch capable of dragging the container onto the trailer bed. A front side of the container is initially lifted from the ground by inserting a wedge underneath the container front end (by pure force). The container is then dragged onto a tilted trailer bed which is coupled to a towing vehicle. After the container is loaded, the trailer is tilted to a generally horizontal transport position for transport of the container to the desired destination.

During loading, friction between the container and the trailer may be considerable. Thus, power required to carry out the loading process may be high. In addition, misalignments between the container and the trailer bed may greatly hinder loading of the container, as alignment cannot be corrected due to the elevated friction between the trailer bed and the container. This is an important drawback, as in practice it can be very difficult to achieve an optimum longitudinal alignment between the trailer and the container prior to loading.

Accordingly, there is an established need for a vehicle trailer system which is suitable for loading, transporting and unloading a load such as a cargo container, which allows for simple and effective loading, transportation and unloading of a cargo container on and from a trailer without damaging the container or its contents, and is thus valid for transporting virtually any kind of cargo including fragile items.

SUMMARY OF THE INVENTION

The present invention is directed to a vehicle trailer system which is suitable for loading, transporting and unloading a load such as a cargo container and which facilitates ease in loading a cargo container onto a trailer regardless of whether or not the cargo container and the trailer are longitudinally aligned. The vehicle trailer systems allows cargo containers to be loaded, transported and stored by smaller trailers in comparison to prior art, and thus boosting the use of cargo containers for a myriad of civil and military applications such as providing temporary housing during disaster relief. The vehicle trailer system includes a trailer front structure which can be coupled to a towing vehicle such as a pickup truck. A trailer rear structure is attached to the trailer front structure and supported on the ground by at least one pair of wheels. The trailer rear structure includes a pivotable structure that is pivotably attached to the trailer front structure. The pivotable structure includes a main body and a transversely-movable structure to support a load and allow the load to pass thereon. A longitudinally-traveling carriage or trolley can be carried by the main body of the pivotable structure. A winch cable can be extended or unwound from a winch that is preferably mounted on the trailer front structure and that is connected to the load as the load rests on the ground behind the trailer. The vehicle trailer system operates together with a lifting mechanism for coupling or uncoupling the front end of the cargo container onto the carriage. The lifting mechanism can optionally be comprised in the vehicle trailer system. For instance, the lifting mechanism can consist of a movable arm that can dispose the cable with a strong vertical component for the cable to pull and lift the load. The winch can be operated to lift the load, and then lower the lifted load onto the carriage, and the movable arm can be operated to lower away from the cable. Subsequent operating of the winch causes the cargo container to be pulled onto the trailer by the carriage, until the trailer pivots from a rearwardly-angled loading position to a horizontal transport position relative to the trailer front structure and the cargo container is fully supported by the trailer.

In a first implementation of the invention, a vehicle trailer system for loading, transporting and unloading a load, comprising a trailer includes a trailer front structure, a pivotable structure rearward of the trailer front structure and pivotably attached to the trailer front structure, and a set of wheels coupled to the pivotable structure and arranged frontward of the transversely-movable structure. The pivotable structure includes an elongated main body extending along a front-to-back, longitudinal direction, and a transversely-movable structure carried by the elongated main body at a rear end of the elongated main body. The transversely-movable structure is operable to move relative to the elongated main body in a side-to-side, transverse direction perpendicular to the longitudinal direction. The trailer is operable to adopt a first position, in which the pivotable structure is supported on a surface by the set of wheels and the transversely-movable structure is in the air. The trailer is operable to further adopt a second configuration, in which the pivotable structure is pivoted rearward relative to the first configuration, the set of wheels is in the air, and the pivotable structure is supported on the surface by the transversely-movable structure.

In a second aspect, the pivotable structure can be pivotable in relation to the trailer front structure about a rotation axis arranged along the transverse direction.

In another aspect, the trailer can be movable to further adopt a third configuration, in which the pivotable structure is pivoted rearward relative to the first configuration and forward relative to the second configuration, and in which the pivotable structure is supported on the surface by both the set of wheels and the transversely-movable structure.

In yet another aspect, the pivotable structure can further include a carriage mounted for bidirectional travel on the elongated main body of the pivotable structure, the carriage comprising a carriage hitch. Preferably, the carriage hitch is configured for the pivotably coupling thereto of a load. For instance, the carriage hitch comprises a hitch ball providing a ball-joint connection for coupling a load. The hitch ball can protrude upwardly from the elongated main body.

In another aspect, the vehicle trailer system can further include a hitch structure removably attachable to a load. The hitch structure can include a hitch coupler for engaging with the carriage hitch, and a fastener for coupling a fastener of a lifting mechanism.

In yet another aspect, the vehicle trailer system can also include at least one roller removably attachable to the load.

In another aspect, two opposite side portions the transversely-movable structure can extend outwardly from two opposite transverse sides of the elongated main body, respectively.

In still another aspect, the transversely-movable structure can further include a pair of rollers rotatable about a transverse rotation axis and providing a roller top side for the passing thereon of a load. A respective roller of the pair of rollers can be arranged on a respective one of the two opposite side portions of the transversely-movable structure.

In another aspect, the transversely-movable structure can include a pair of upwardly oriented low-friction surfaces facilitating the sliding thereon of a load. Each upwardly oriented low-friction surface can be arranged on a respective one of the two opposite side portions of the transversely-movable structure. For instance, the low-friction surfaces can be made of ultra-high molecular weight polyethylene (UHMW).

In yet another aspect, the vehicle trailer system can include a load-lifting mechanism. In some embodiments, the load-lifting mechanism can be carried by the pivotable structure and can adopt a lowered position in which the carriage is able pass over the load-lifting mechanism when the carriage travels on the elongated main body.

In another aspect, the vehicle trailer system can include a suspension system providing a relative vertical movement between the pivotable structure and the set of wheels. The suspension system can also provide a relative transverse movement between the pivotable structure and the trailer wheels.

In yet another aspect, the trailer front structure can include a trailer hitch coupler for attaching to a hitch carried by a vehicle.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 3 presents a side elevation view of the trailer of the vehicle trailer system of FIG. 1, deployed in a container transporting configuration;

FIG. 4 presents a side elevation view of the trailer of the vehicle trailer system of FIG. 1, deployed in second configuration, in which the pivotable structure of the trailer rear structure has been lowered to support the trailer rollers on the ground;

FIG. 5 presents a side elevation view of view of the trailer of the vehicle system of FIG. 1, deployed in a third configuration, in which the pivotable structure and the trailer front structure have been further pivoted to lift the trailer wheels off the ground;

Like reference numerals refer to like parts throughout the several views of the drawings.

DETAILED DESCRIPTION

Figure 1:
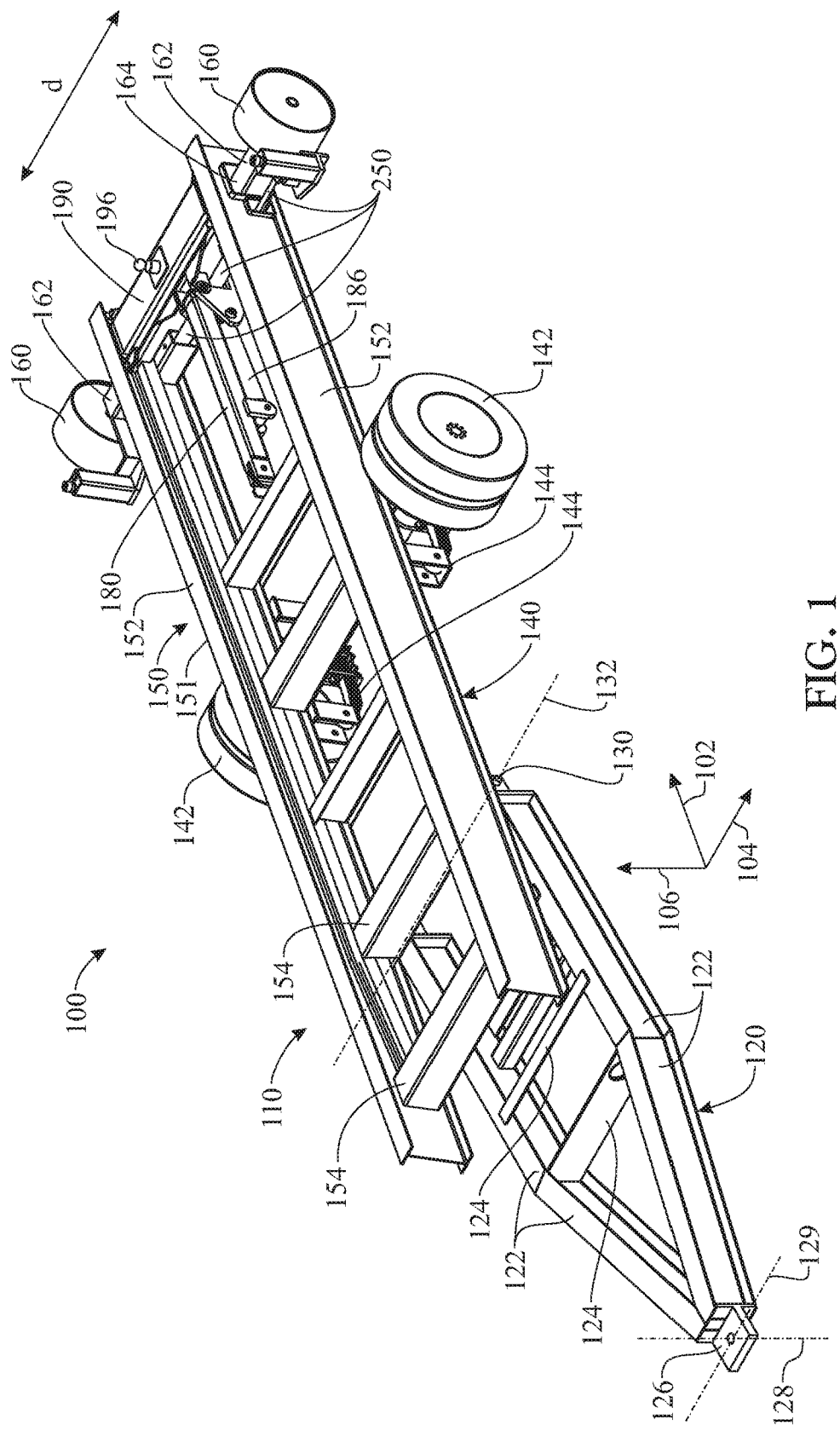
FIG. 1 presents a front perspective view of an illustrative embodiment of the vehicle trailer system of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a vehicle trailer system which is suitable for loading, transporting and unloading a load such as a cargo container. As will be illustrated hereinafter, the vehicle trailer system in accordance with the invention is able to perfectly load a container regardless of the degree of misalignment between the container and the vehicle trailer system, and can easily unload the container on the ground at misaligned locations respective to the vehicle trailer system. In addition, the vehicle trailer system of the present invention requires a minimal trailer length for loading and unloading the container. In consequence, the trailer system may present a relatively small length in comparison to container-transporting trailer systems known currently in the art in which the container is dragged onto a tilted trailer bed. Furthermore, because the vehicle trailer system needs not be as long as conventional container-dragging vehicle trailer systems, the vehicle trailer system of the present invention can present a reduced weight and thus permit the container to carry an increased load. Moreover, as will be explained, the vehicle trailer system of the present invention can minimize friction between the trailer and the container while loading and unloading the container, thus minimizing the force and power required to pull the container and providing an extremely smooth and non-jerky loading of the container. In consequence, the pulling mechanism or winch carried by the trailer or truck will be required to exert a minimal force and power in comparison to conventional container-dragging vehicle trailer systems. In practice, the vehicle trailer system of the present invention will allow picking up and unloading cargo containers from and to virtually anywhere, and towing cargo containers by a greater variety of vehicles; these advantageous effects will ultimately allow containers to become widely utilized as their loading, transportation and unloading will not necessarily have to be driven by larger and more costly vehicles such as semi-trailer trucks of the kind that do not include a forklift, crane or other lifting machine, or forklift- or crane-provided vehicles.

Referring initially to FIGS. 1 and 3-9, an illustrative embodiment of the vehicle trailer system in accordance with the present invention is depicted. The vehicle trailer system 100 includes a trailer 110 for supporting and transporting cargo, such as but not limited to a cargo container 400 such as that of FIG. 2. As shown in FIG. 1, the trailer 110 is generally elongated along a length-wise, front-to-back or longitudinal direction 102, and comprises a trailer front structure 120 for attachment to a towing vehicle, and a trailer rear structure 140 which is pivoted to the trailer front structure 120, as will be explained hereinafter. A width-wise, side-to-side or transverse direction 104 is further defined, as shown in FIG. 1, together with a height-wise, top-to-bottom or vertical direction 106. Reference is made to the three orthogonal directions 102, 104, 106 throughout the present disclosure. In addition, unless expressly mentioned otherwise, the terms "longitudinal" and "transverse" shall be understood throughout the present document to mean in the longitudinal direction 102 and the transverse direction 104, respectively.

The trailer front structure 120 of the present embodiment is configured to be coupled to a towing vehicle (an exemplary rear section of a vehicle 320 being shown in FIGS. 3 through 5). The trailer front structure 120 may include a pair of side frame members 122 and at least one frame brace 124 to form a rigid structure. A trailer hitch coupler 126 may be provided on the trailer front structure 120 to facilitate coupling of the trailer front structure 120 to a companion hitch 330 (FIGS. 3 through 5), such as but not limited to a ball-type hitch, on the towing vehicle or connected to the towing vehicle. The attachment between the trailer hitch coupler 126 and the hitch 330 may facilitate pivoting of the trailer front structure 120 in a horizontal plane (i.e. about a vertical rotation axis 128) and in a vertical plane (i.e. about a horizontal and transverse rotation axis 129) with respect to the towing vehicle, as will be explained in greater detail hereinafter with reference to FIGS. 3 through 5.

The trailer rear structure 140, in turn, comprises at least one pair of trailer wheels 142 and a pivotable structure 150 which is supported on the ground by the at least one pair of trailer wheels 142. The trailer rear structure 140 may further include a suspension system 144 (FIG. 1) which provides relative vertical movement between the trailer wheels 142 and the pivotable structure 150. In addition, the suspension system 144 can provide a relative transverse movement between the pivotable structure 150 and the trailer wheels 142.

The pivotable structure 150 of the trailer rear structure 140 of the present embodiment may include a pair of generally elongated trailer rails 152, arranged along the longitudinal direction 102, parallel and spaced-apart with respect to each other. At least one frame brace 154 may connect the trailer rails 152 to form a rigid structure, frame or main body 151 of the pivotable structure 150. The frame braces 154 of the present embodiment are arranged transversely, i.e., perpendicular to the longitudinal trailer rails 152. The pivotable structure 150 of the trailer rear structure 140 of the present embodiment is pivotably attached to the trailer front structure 120 by having the trailer rails 152 pivotally attached to a respective side frame member 122 of the trailer front structure 120. An articulated connection is provided between each trailer rail 152 and the respective side frame member 122 of the trailer front structure 120; each articulated connection of the present embodiment is provided by a respective pivot pin 130. The articulated connections or pivot pins 130 define a pivot axis 132, which in the present embodiment is arranged in the transverse direction 104. Accordingly, the pivotable structure 150 of the trailer rear structure 140 may be selectively pivoted vertically upward and downward with respect to the trailer front structure 120.

With continued reference to FIG. 1, a pair of trailer rollers 160 may be provided on the trailer 110, and particularly on the rear end of the pivotable structure 150 of the trailer rear structure 140. The trailer rollers 160 may be mounted for rotation on a pair of roller mount members 162, respectively, which extend outwardly from the respective trailer rails 152 generally at or adjacent to the rear end of the trailer 110. The pair of roller mount members 162 of the present embodiment are provided by opposite ends of a rear crossbeam 164, which extends across the pivotable structure 150. The position of the trailer rollers 160 along a transverse direction d is adjustable, by having the rear crossbeam 164 supporting the trailer rollers 160 translatable along the transverse direction d when operated by an actuator. The actuator of the present embodiment consists of a hydraulic cylinder 250. The purpose of the transversely movable trailer rollers 160 will be hereinafter described.

As shown in the side elevation views of FIGS. 3 through 5, the trailer 110 further includes a tilt actuator 260 connected to the trailer front structure 120 and the pivotable structure 150 of the trailer rear structure 140; the tilt actuator 260 can exert a relative force between the pivotable structure 150 and the trailer front structure 120 to facilitate tilting of the pivotable structure 150 with respect to the trailer front structure 120 and the ground 300. The tilt actuator 260 of the present embodiment includes a hydraulic cylinder 264, a first end of which is connected to a frame brace 154 of the pivotable structure 150 via a first articulated connection 266, and a second end of which is connected to a frame brace 124 of the trailer front structure 120 via a second articulated connection 268. The hydraulic cylinder 264 is configured to selectively expand or compress in dependence of user operation of a commanding console or remote control, as known in the art, thereby causing the front end of the pivotable structure 150 to move away from or towards the rear end of the trailer front structure 120 about the pivot axis 132, and the front end of the pivotable structure 150 and rear end of the trailer front structure 120 to descend or rise, as will be explained in greater detail hereinafter.

The illustrations of FIGS. 3 through 5 present the trailer front structure 120 and the pivotable structure 150 of the trailer rear structure 140 in three different pivotal positions in relation to one another. The three different pivotal positions can be achieved by selective operation of the commanding console or remote control to extend or compress the hydraulic cylinder 264. In a first relative pivotal position, shown in FIG. 3, the hydraulic cylinder 264 is shown in a compressed position; correspondingly, the pivotable structure 150 of the trailer rear structure 140 is pivoted in a counterclockwise direction about the pivot axis 132, and generally resting on the trailer front structure 120, which is in turn arranged substantially horizontally. In this first position, the trailer rails 152 are arranged in a generally horizontal position, while the trailer wheels 142 are supported on the ground 300. In addition, the trailer rollers 160 are elevated and not in contact with the ground 300. In a second relative pivotal position, shown in FIG. 4, the hydraulic cylinder 264 is partially extended; correspondingly, the pivotable structure 150 of the trailer rear structure 140 is pivoted away from the trailer front structure 120, in a clockwise direction about the pivot axis 132. The trailer rails 152 are arranged in an oblique direction, while the trailer wheels 142 continue to be supported on the ground 300. In this second relative pivotal position, the trailer rollers 160 have come into contact with and rest on the ground 300. The trailer front structure 120, in turn, has pivoted in a counterclockwise direction as pulled by the hydraulic cylinder 264, thus raising the pivot axis 132. In a third relative pivotal position, shown in FIG. 5, the hydraulic cylinder 264 is further extended; correspondingly, the pivotable structure 150 of the trailer rear structure 140 is pivoted further in the clockwise direction, causing the trailer front structure 120 and pivotable structure 150 of the trailer rear structure 140 to become more oblique, the pivot axis 132 to further rise, and the trailer wheels 142 to lift off the ground 300, while the trailer rollers 160 continue to be supported on the ground 300. As shown in the figures, a front roller 270 can be arranged at or near the trailer hitch coupler 126, and can remain supported on the ground 300 in all three positions, to facilitate switching from one position to another.

Turning to the illustrations of FIGS. 6 and 7, a container-lifting mechanism is provided on the vehicle trailer system 100 to allow the vehicle trailer system 100 to lift a container and hitch it onto the vehicle trailer system 100 as a first step of a loading sequence, as will be explained, or lift a container off the vehicle trailer system 100 in a last step of an unloading sequence. The container-lifting mechanism of the present embodiment, for instance, comprises a movable arm 180 pivotally mounted on the trailer 110, and particularly, on the main body 151 of the pivotable structure 150 of the trailer rear structure 140. In order to support the movable arm 180, the pivotable structure 150 can include an arm mount member 166, which may extend between the trailer rails 152 at a rear end of the trailer rear structure 140, the movable arm 180 being affixed to and supported by the arm mount member 166. In some embodiments, a pair of spaced-apart arm mount flanges 168 may extend forwardly from the arm mount member 166. The movable arm 180 may be pivotally mounted between the arm mount flanges 168 via an arm pivot point 182. Accordingly, the movable arm 180 may be pivotal between a lowered position such as that of FIG. 6 and a raised position such as that of FIG. 7, for purposes which will be hereinafter described. A pulley 184 and retainer 185 may be provided at the end of the movable arm 180; the retainer 185 can be a substantially U-shaped channel as shown in the drawings, or the like, for allowing a cable, chain, rope, cord or other flexible, windable elongated element (hereinafter referred to generally as cable) to slide longitudinally therethrough and on the pulley 184 while transversely retaining the cable therein. A pneumatic, hydraulic or electric arm actuating cylinder 186 may be pivotally attached to the pivotable structure 150 and the movable arm 180; for instance, the arm actuating cylinder 186 of the present embodiment is pivotally attached to the arm mount flanges 168 of the pivotable structure 150 and to the movable arm 180. The arm actuating cylinder 186 can be operated to extend, retract and pivot by appropriate user operation of user-operable cylinder controls, which may be arranged on a wired or wireless console (not shown) in communication with the trailer 110 as known in the art. The arm actuating cylinder 186 may be selectively operable to pivot the movable arm 180 at the arm pivot point 182 and deploy the movable arm 180 in the lower position illustrated in FIG. 6 or in the raised position illustrated in FIG. 7 responsive to retraction and extension, respectively, of the arm actuating cylinder 186.

Figure 6:
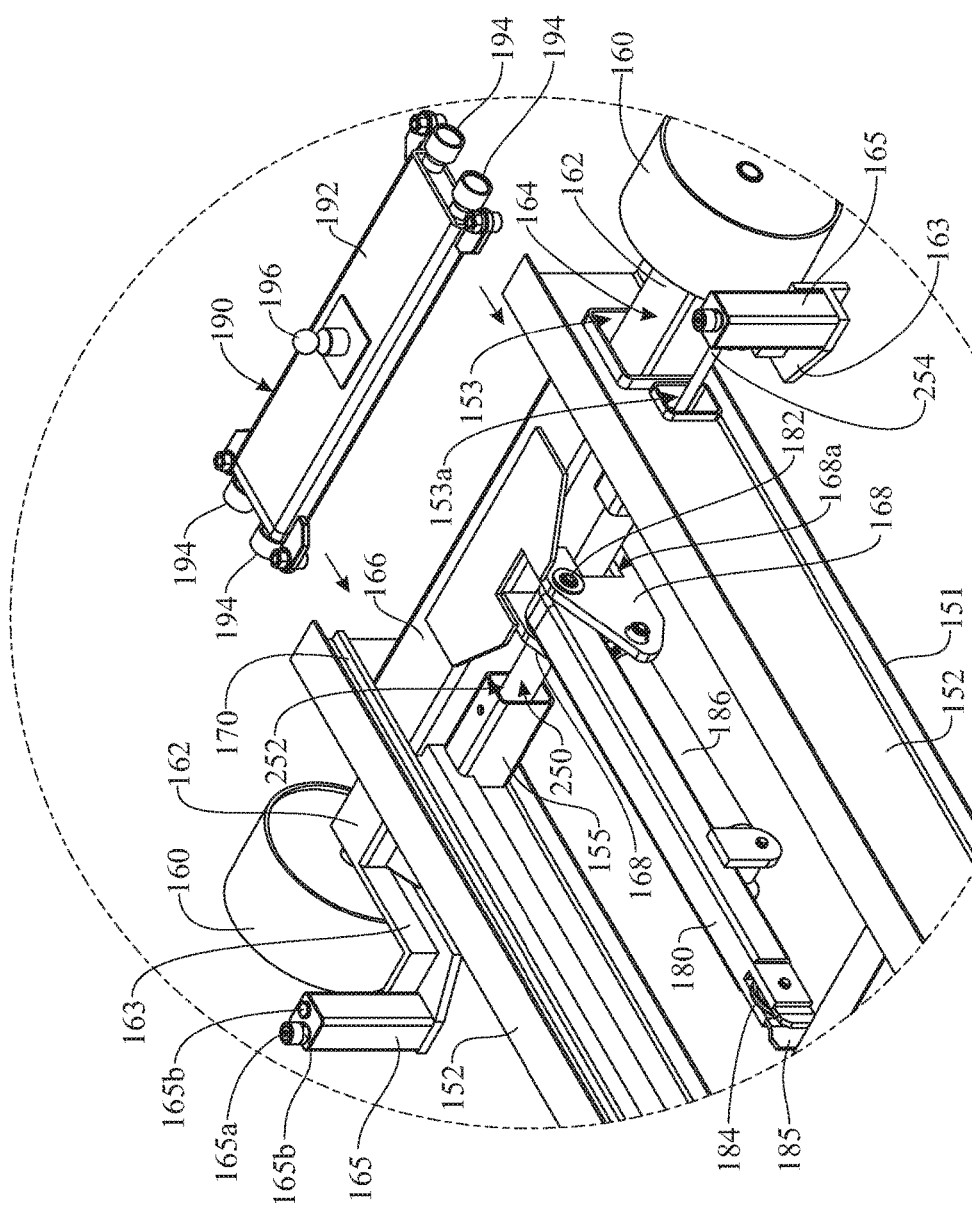
FIG. 6 presents an enlarged exploded perspective view of a rear portion of the trailer, more particularly illustrating typical rolling engagement of a carriage with the trailer rear structure, and a movable arm deployed in a lowered position.
Figure 7:
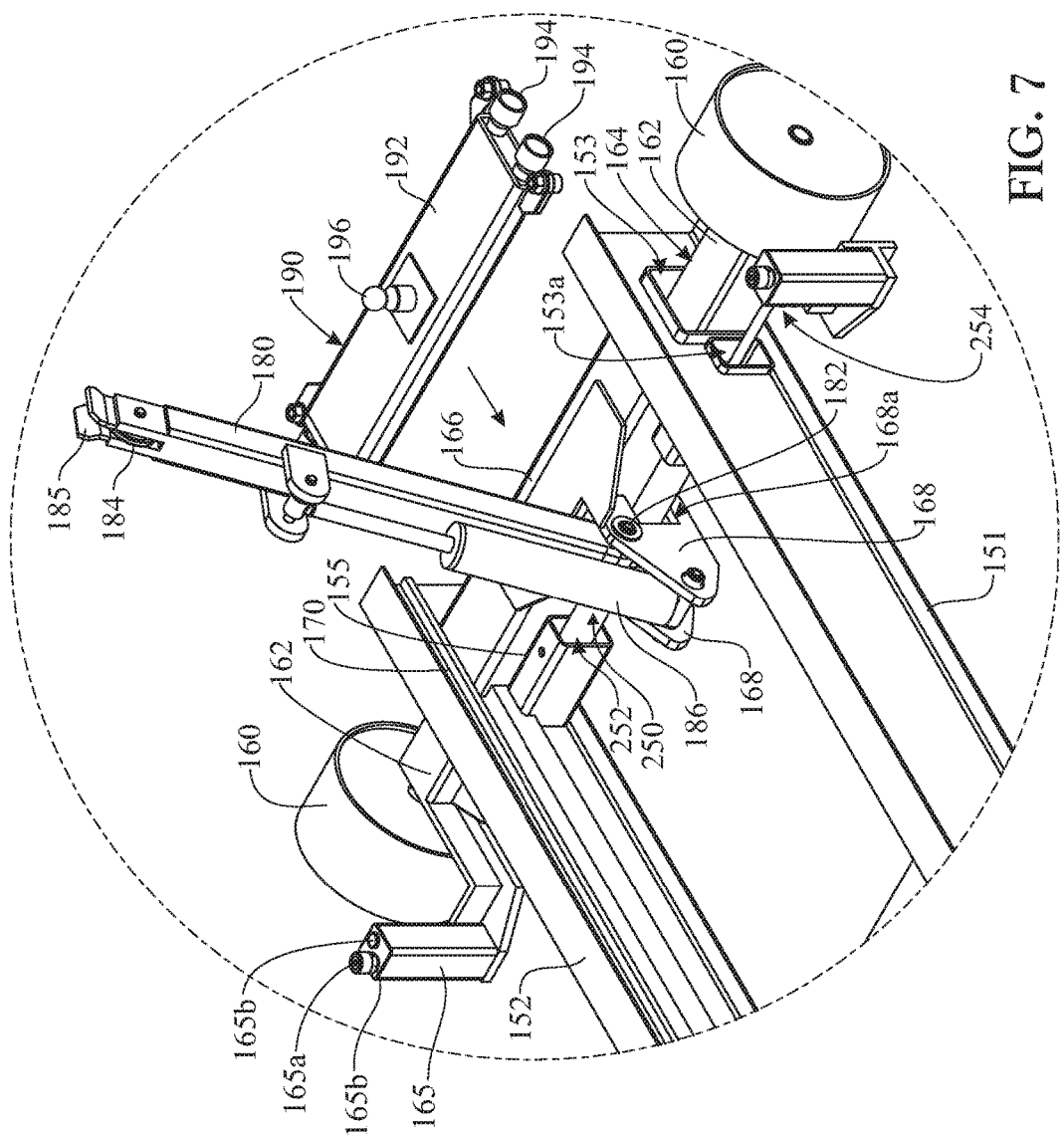
FIG. 7 presents an enlarged exploded perspective view of a rear portion of the trailer, more particularly illustrating typical rolling engagement of the carriage with the trailer rear structure, and the movable arm deployed in a raised position.

With continued reference to FIGS. 6 and 7, a carriage 190 is mounted for bidirectional travel on the trailer 110. For this purpose, the pivotable structure 150 of the trailer rear structure 140 of the present embodiment includes a pair of carriage roller channels, tracks or grooves 170 be provided in the respective trailer rails 152 of the pivotable structure 150 in facing relationship to each other. As illustrated in FIG. 6, the carriage 190 comprises a carriage body 192, which can be generally planar and rectangular. At least one carriage roller 194 may be provided on each end of the carriage 190, rotatably attached to the carriage body 192. Each carriage roller 194 may be sized and configured for insertion into the carriage roller groove 170 in the trailer rail 152 on the corresponding side of the pivotable structure 150 of the trailer rear structure 140. A carriage hitch 196 may be provided on the carriage 190 for purposes which will be hereinafter described. Preferably, the carriage hitch 196 is in longitudinal registration or alignment with the pivotable arm 180, as shown in the drawings.

Figure 8:
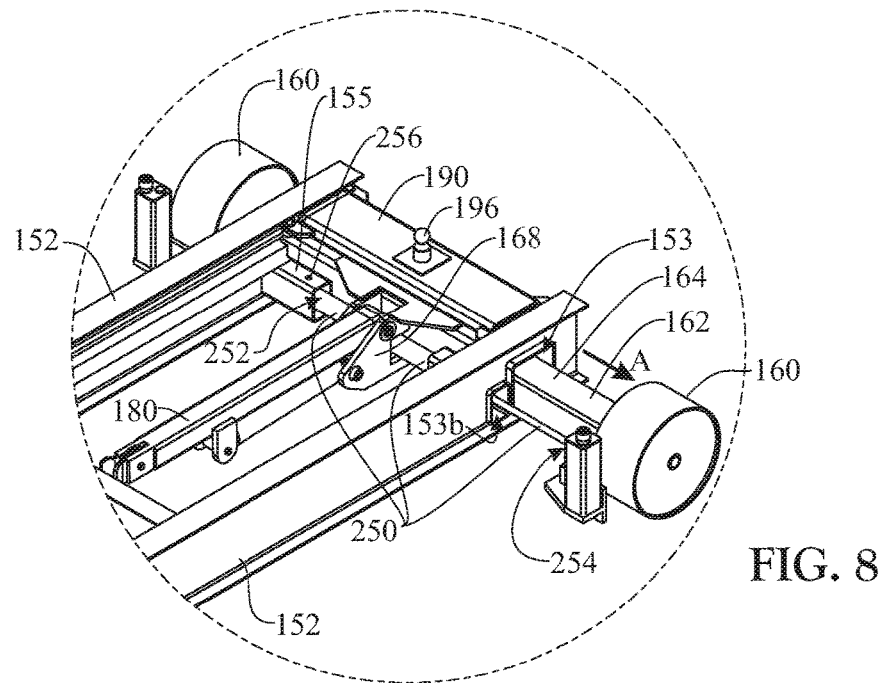
FIG. 8 presents a right side perspective view reflecting the trailer rollers being transversely shifted in a first direction.
Figure 9:
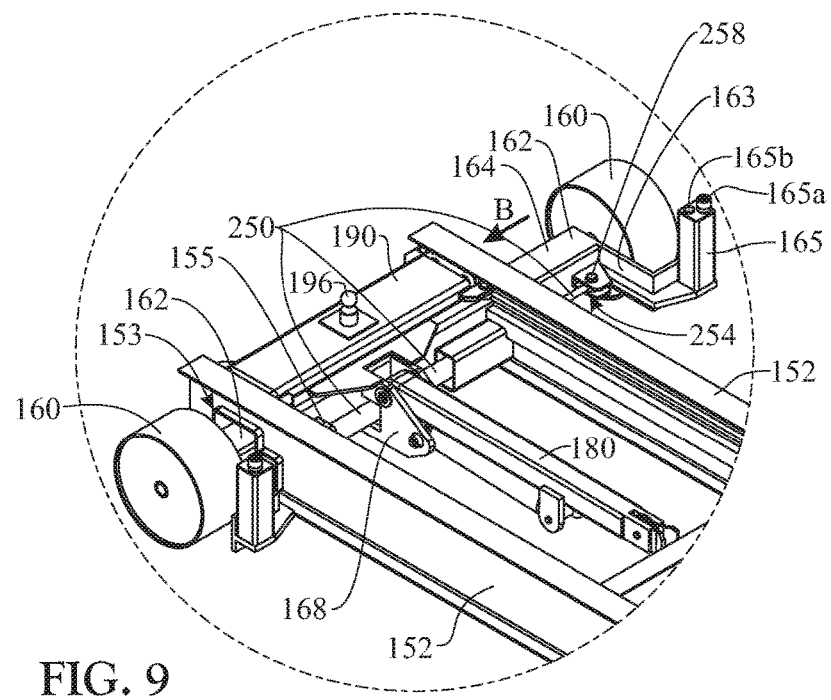
FIG. 9 presents a left side perspective view reflecting the trailer rollers being shifted in a second direction opposite to the first direction.

As can be seen in FIGS. 6 and 7, the arm mount member 166 of the present embodiment is hollow. The rear crossbeam 164 extends through the hollow arm mount member 166 and protrudes outwardly through respective openings 153 in each trailer rail 152 (FIGS. 8 and 9). With continued reference to FIG. 6, a first end 252 of the hydraulic cylinder 250 is coupled to one of the trailer rails 152, and more specifically, to a receiving portion 155 that protrudes transversely from the trailer rail 152. The hydraulic cylinder 250 extends behind the movable arm 180, through openings 168a in the arm mount flanges 168, and through a second opening 153a in the other trailer rail 152. As best shown in FIG. 9, an opposite second end 254 of the hydraulic cylinder 250 is arranged outside the trailer rails 152 and is coupled to the roller mount member 162 or end of the rear crossbeam 164. Preferably, the first and second ends 252, 254 of the hydraulic cylinder 250 are coupled to the receiving portion 155 and the roller mount member 162 via respective articulated connections 256, 258, which are articulated about a respective generally vertical pivot axis. Because one end of the hydraulic cylinder 250 (i.e. first end 152) is attached to the trailer rail 152 and the other end (i.e. second end 154) is attached to the rear crossbeam 164, selective operation of the hydraulic cylinder 250 can cause the rear crossbeam 164 to move transversely in relation to the trailer rails 152 and, thus, to the pivotable structure 150. Specifically, as shown in FIG. 8, expansion of the hydraulic cylinder 250 can cause the second end 254 of the hydraulic cylinder 250 to push the rear crossbeam 164 transversely, and therefore move the rear crossbeam 164 and the trailer rollers 160 assembled thereon in the transverse direction indicated by arrow A. In turn, as shown in FIG. 9, compression of the hydraulic cylinder 250 can cause the second end 254 of the hydraulic cylinder 250 to pull on the rear crossbeam 164, and therefore move the rear crossbeam 164 and the trailer rollers 160 assembled thereon in the opposite transverse direction indicated by arrow B. Therefore, the trailer rollers 160 are selectively movable in opposite transverse directions relative to the pivotable structure 150, in dependence of whether the hydraulic cylinder 250 is operated to expand or compress.

As best shown in FIG. 6, an L-shaped link section 163 extends forwardly and outwardly from each roller mount member 162. The link section 163 ends in an elevated support 165, a top portion of which comprises an adjustable stop 165a which can be selectively inserted into one of a plurality of receiving holes 165b, for purposes that will be explained hereinafter. For instance, the elevated support 165 of the present embodiment includes two receiving holes 165b; the adjustable stop 165a is shown inserted into an outermost receiving hole 165b. The link section 163 and elevated support 165 are transversely movable together with the rear crossbeam 164 and the trailer rollers 160; for instance, the link section 163 and elevated support 165 of the present embodiment are integrally formed into a single-piece unit with the rear crossbeam 164.

Figure 2:
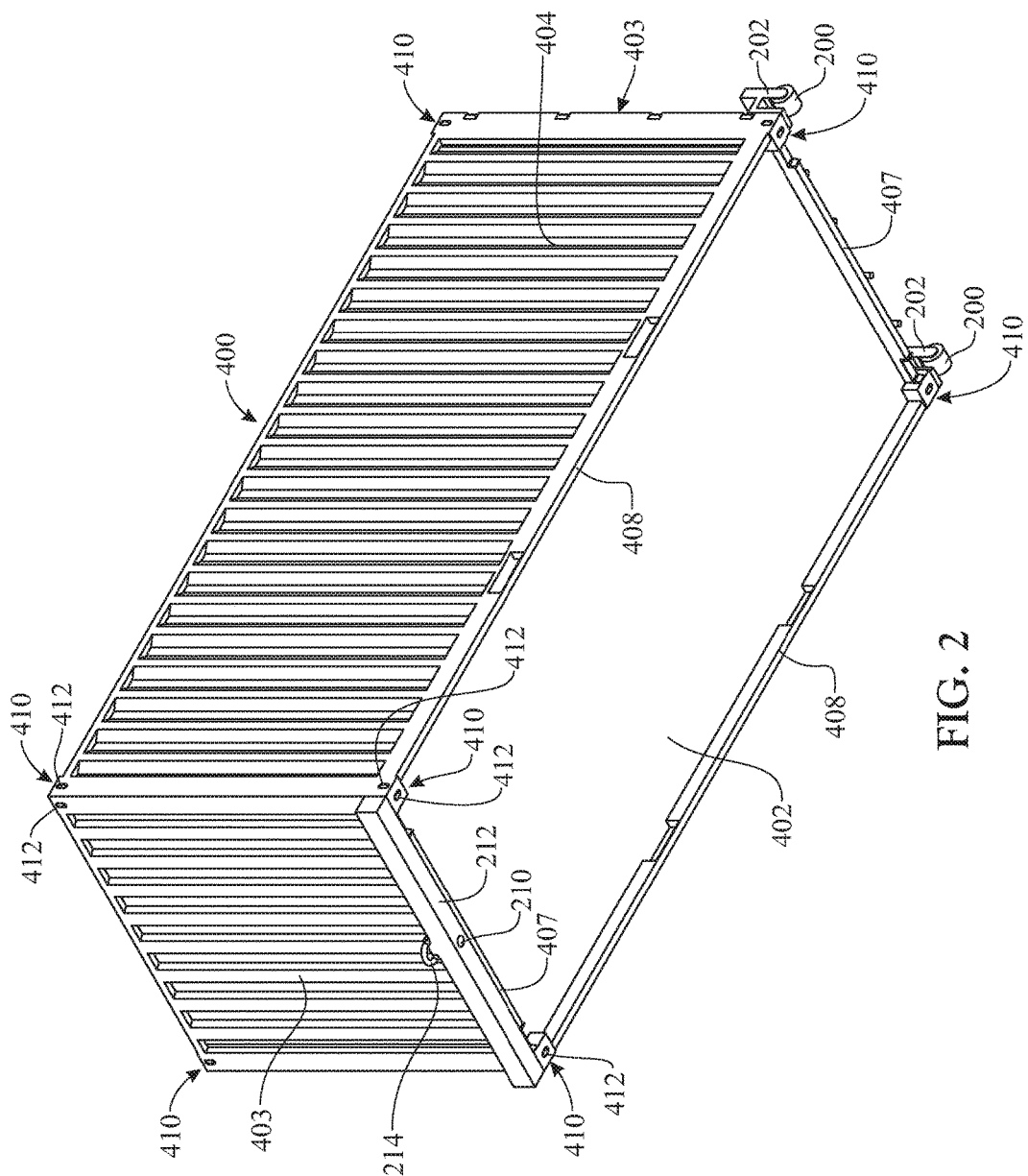
FIG. 2 presents a bottom perspective view of a typical cargo container which is suitable for implementation of the vehicle trailer system of the present invention.

The illustration of FIG. 2 presents a cargo container 400 as known in the art, which has been configured to be loaded onto the trailer 110 in accordance with the present invention. The cargo container 400 may include a cargo container floor 402. Multiple cargo container walls, such as two longitudinally opposed cargo container end walls 403 and two transversely opposed cargo container side walls 404 may extend upwardly from the cargo container floor 402. A cargo container ceiling 406 (FIGS. 10-18) may be provided above the walls 403, 404. The walls 403, 404 include respective bottom edges or sides 407, 408 designed to support the cargo container 400 when left on the ground, in typical applications of the cargo container 400. The cargo container 400 may have at least one cargo container door (not illustrated) which facilitates loading and unloading of cargo (not illustrated) into and out of the cargo container 400. One of ordinary skill in the art will understand that many types of cargo containers or other cargo-supporting structures may be utilized with the vehicle trailer system 100 of the present invention. For instance, the cargo container 400 shown in FIG. 2 is of the type known as an ISO container, which includes eight ISO connectors 410, one at each respective corner of the cargo container 400. As known in the art, an ISO connector is a standardized container corner block, including an interior corner cavity and three contiguous access openings 412 that permit the attachment of fasteners for securing loading straps, chains or cables when loading and unloading containers, or fastening straps, chains or cables when securing containers for safe transportation, to name a few applications. In other examples, the cargo-supporting structure can be a floor, skid floor or flatbed; for example, the cargo-supporting structure can take the form of a load-supporting floor provided with four corner connectors (similarly to cargo container floor 402 and ISO connectors 410 of the depicted embodiment), with no walls or ceiling.

In order to adapt the cargo container 400 to be loaded by the vehicle trailer system 100 of the present embodiment, the vehicle trailer system 100 can further include a pair of cargo container rollers 200 that are attachable to a bottom rear end of the cargo container 400. For instance and without limitation, as shown in FIG. 2, each cargo container roller 200 of the present embodiment is rotatably supported by a roller structure 202, which is in turn securable to a bottom ISO connector 410 of the cargo container 400 by a nut and bolt, threaded pin, clamp or any other applicable fastener (not shown). One of ordinary skill in the art will understand that several types of fasteners may be employed; these various fasteners will not be described in detail so as not to obscure the invention. The illustration of FIG. 2 shows the exemplary pair of cargo container rollers 200 attached to the cargo container 400.

To further adapt the cargo container 400 for being loaded and unloaded by the vehicle trailer system 100 of the present embodiment, the vehicle trailer system 100 can also include a cargo container hitch coupler 210 configured to couple to the carriage 190; for purposes that will be hereinafter described, the cargo container hitch coupler 210 of the present embodiment is specifically configured for coupling to the carriage hitch 196 on the carriage 190. The cargo container hitch coupler 210 can be disconnectably attachable to a bottom front end of the cargo container 400. For instance and without limitation, as shown in FIG. 2, the cargo container hitch coupler 210 can be a cavity or recess that is provided on a bottom side of a hitch structure 212 in the shape of an elongated beam. The recessed cargo container hitch coupler 210 can be arranged substantially at the center of the hitch structure 212. The hitch structure 212 can be in turn disconnectably securable to opposed bottom front ISO connectors 410 of the cargo container 400 by the connection of a respective nut and bolt fastener, threaded pin, clamp or any other applicable fastener (not shown) to the front opening 412 of each opposite bottom front ISO connector 410; in alternative embodiments, the hitch structure 212 can alternatively or additionally attach to side openings 412 of the ISO connectors 410. Again, one of ordinary skill in the art will understand that several types of fasteners may be employed; these various fasteners will not be described in detail so as not to obscure the invention. The illustration of FIG. 2 shows the exemplary hitch structure 212 and cargo container hitch coupler 210 attached to the cargo container 400. In addition, the cargo container hitch coupler 210 may include a fastener 214 (e.g., a ring, as shown) that is welded or otherwise attached to the hitch structure 212; in other embodiments, the cargo container hitch coupler 210 may include any other type of mechanical component to which a hook, a self-closing hook, or the like can be coupled. The fastener 214 of the present embodiment is arranged also at the center of the hitch structure 212, in longitudinal registration with the cargo container hitch coupler 210 if the cargo container 400 is observed in top plan view. The fastener 214 and the cargo container hitch coupler 210 can also be arranged substantially in vertical registration, such as in the present embodiment.

In some embodiments, the carriage hitch 196 on the carriage 190 may include a hitch ball to facilitate a ball joint connection between the carriage 190 and the hitch structure 212 that allows pivoting of the cargo container hitch structure 212 (FIG. 2) affixed to the cargo container 400 within a horizontal plane. Thus, the ball-joint connection between the carriage hitch 196 permits the cargo container 400 to rotate horizontally with respect to the carriage 190, and therefore, be able to facilitate loading of the cargo container 400 onto the trailer 110 in the event that the cargo container hitch coupler 210 is not initially precisely aligned with the carriage hitch 196. Preferably, the ball joint connection is arranged higher than adjacent portions of the trailer rails 152 so that the cargo container 400 does not rest on the trailer rails 152 when coupled to the ball joint connection, thus allowing the cargo container 400 to rotate horizontally without the trailer rails 152 frictionally interfering with the rotation. Additionally, the ball-joint connection between the carriage hitch 196 and the cargo container hitch coupler 210 may allow the container hitch structure 212 and the cargo container 400 to slightly pivot vertically, i.e., may present a vertical tolerance which renders the joint between the trailer 110 and the cargo container 400 more resistant, durable and versatile.

The illustrations of FIGS. 10 through 18 present an exemplary application of the vehicle trailer system 100, and more particularly, a sequence of steps for loading a cargo container 400 onto the trailer 110 of the vehicle trailer system 100, wherein the cargo container 400 is in close proximity of an obstacle 310, thus preventing the trailer 110 from longitudinally aligning with the cargo container 400.

Figure 10:
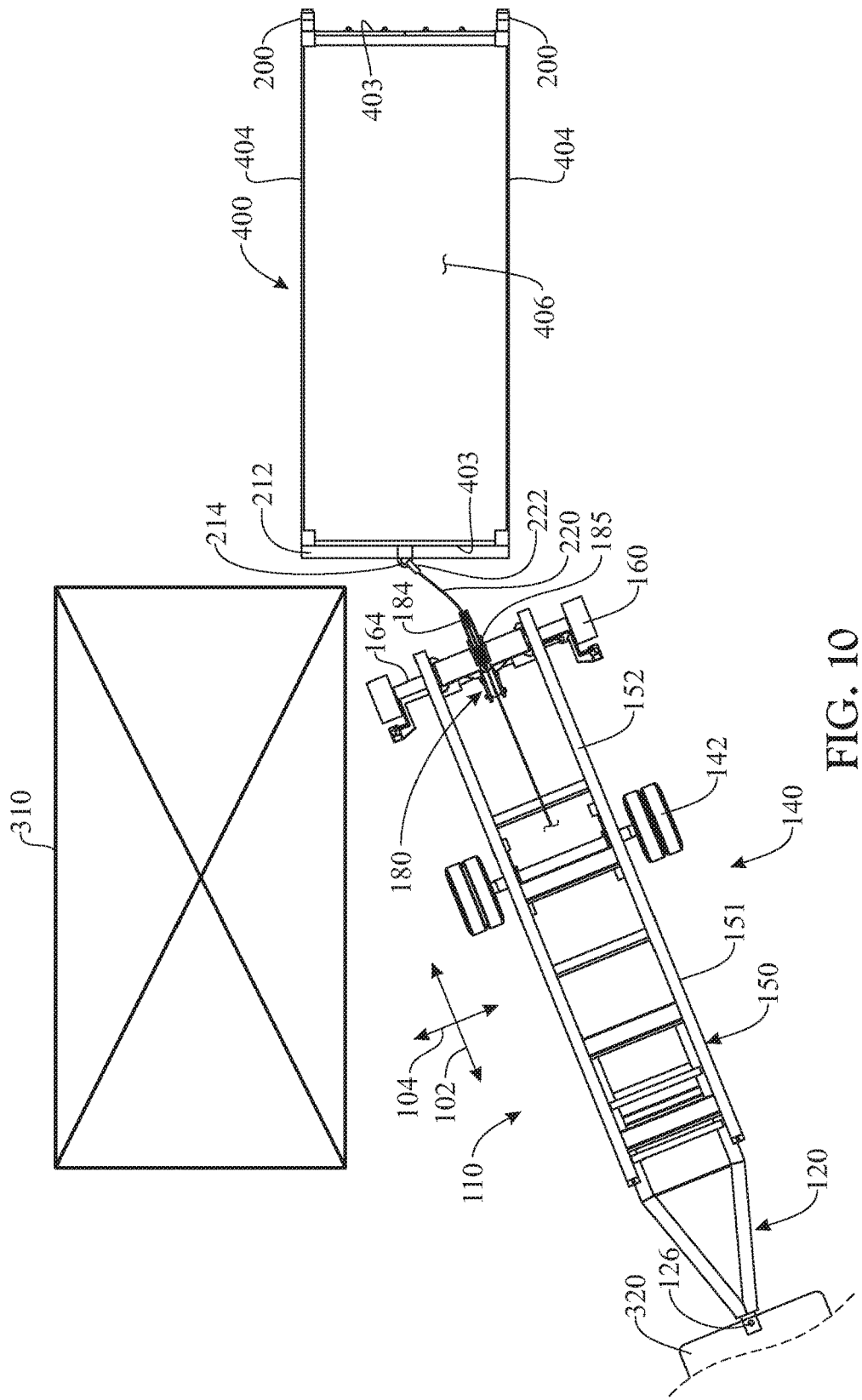
FIG. 10 presents a top plan view of the vehicle trailer system of FIG. 1 backed up close to a cargo container and preparatory to loading of the cargo container onto the trailer, wherein an obstacle restricts the trailer from aligning with the cargo container.

With initial reference to FIG. 10, a vehicle 320 carrying the trailer 110 of the present embodiment (set to the transport position of FIG. 3 and with the movable arm 180 in the lowered position of FIG. 6) backs up towards the cargo container 400 until the rear end of the trailer 110 is arranged near a front end wall 403 of the cargo container 400. The cargo container 400 has been previously fitted with the cargo container rollers 200 and the cargo container hitch structure 212 as depicted in FIG. 2. A winch cable 220 is then unwound and extended from a winch (not illustrated). The term winch cable is used generally to refer to any flexible, windable elongated element capable of being wound on a winch and pulling the required load weight; for instance and without limitation, the term winch cable can include a metallic cable, a wire, a chain, a cord, or the like. The winch can be provided on the trailer front structure 120; in other embodiments, the winch can be provided on the towing vehicle. The winch can be operated to rotate in a winding direction or an unwinding direction, and stopped by appropriate user operation of user-operable winch controls, which may optionally be arranged in the same console as the user-operable cylinder controls for operating the arm actuating cylinder 186.

Once the winch cable 220 is extended, the user couples the hook 222 at the end of the winch cable 220 to the fastener 214 of the hitch structure 212, and operates the vehicle trailer system 100 to lift the movable arm 180 to the elevated position of FIG. 7. When lifting the movable arm 180, the retainer 185 can engage with the winch cable 220 if the winch cable 220 is arranged in the vertically ascending trajectory of the retainer 185; alternatively, the user can place the winch cable 220 within the retainer 185. Once the movable arm 180 is elevated, and the winch cable 220 is engaged with the retainer 185, over the pulley 184, and hooked to the fastener 214 of the cargo container hitch structure 212, the vehicle trailer system 100 has reached the situation depicted in FIG. 10. As shown in the figure, because the fastener 214 is not longitudinally aligned with the movable arm 180, the portion of winch cable 220 extending from the pulley 184 of the movable arm 180 to the fastener 214 is arranged at an angle (as observed in the top plan view of the figure) with respect to the longitudinal direction 102 of the trailer 110.

Once the winch cable 220 is hooked, the user can operate the controls of the vehicle trailer system 100 to lift the trailer front structure 120 and the pivotable structure 150 of the trailer rear structure 140 to an elevated position (FIG. 4 or 5). In the present application, since a significant misalignment between cargo container 400 and trailer 110 must be overcome, the user specifically lifts the trailer 110 to the topmost elevated position of FIG. 5. In this topmost elevated position, the trailer wheels 142 of the trailer rear structure 140 are in the air, and only the trailer rollers 160 of the trailer rear structure 140 are supported on the ground 300.

Figure 11:
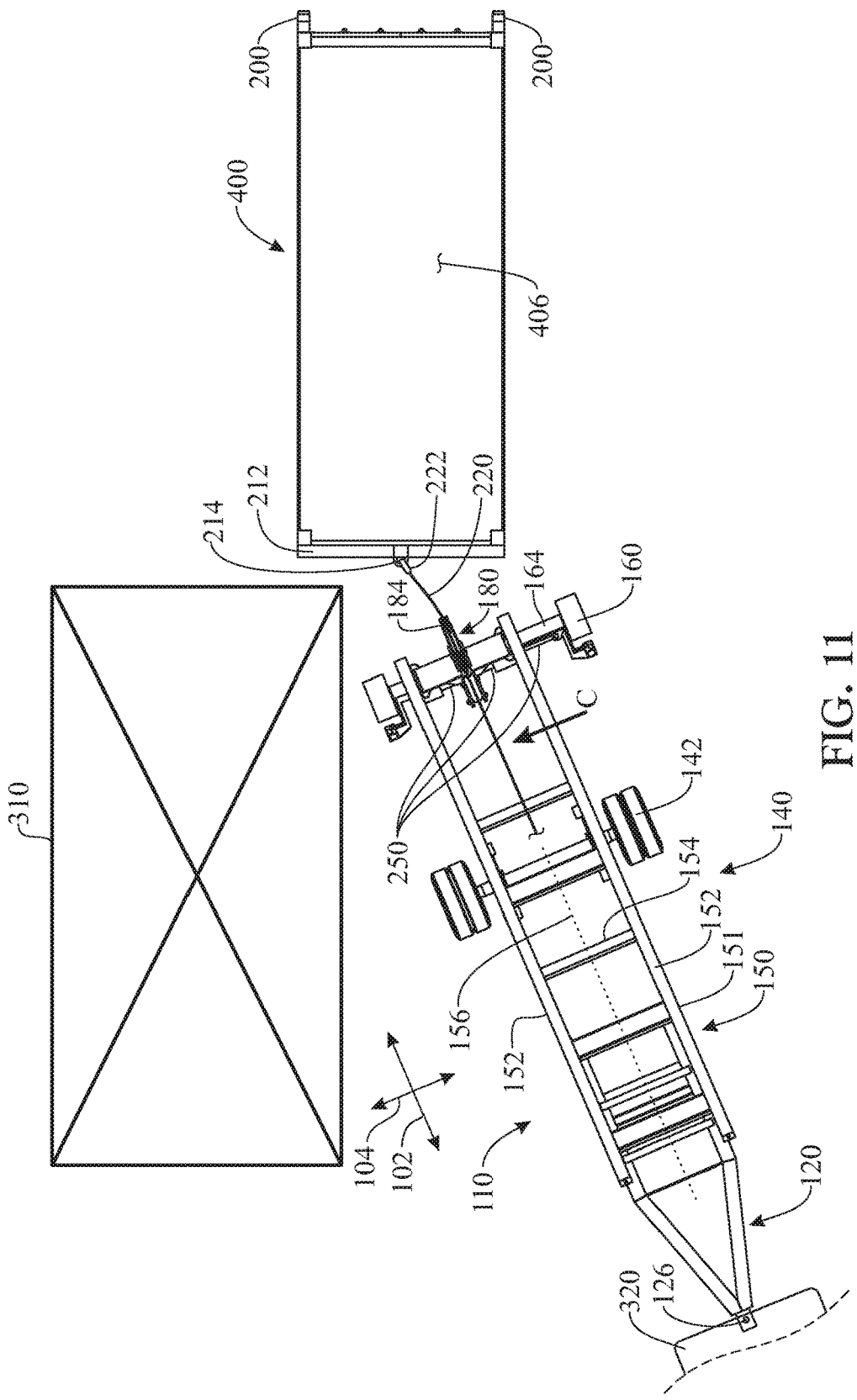
FIG. 11 presents a top plan view of the vehicle trailer system and cargo container of FIG. 10 in a second situation, in which the main body of the pivotable structure has been shifted transversely towards the obstacle.
Figure 12:
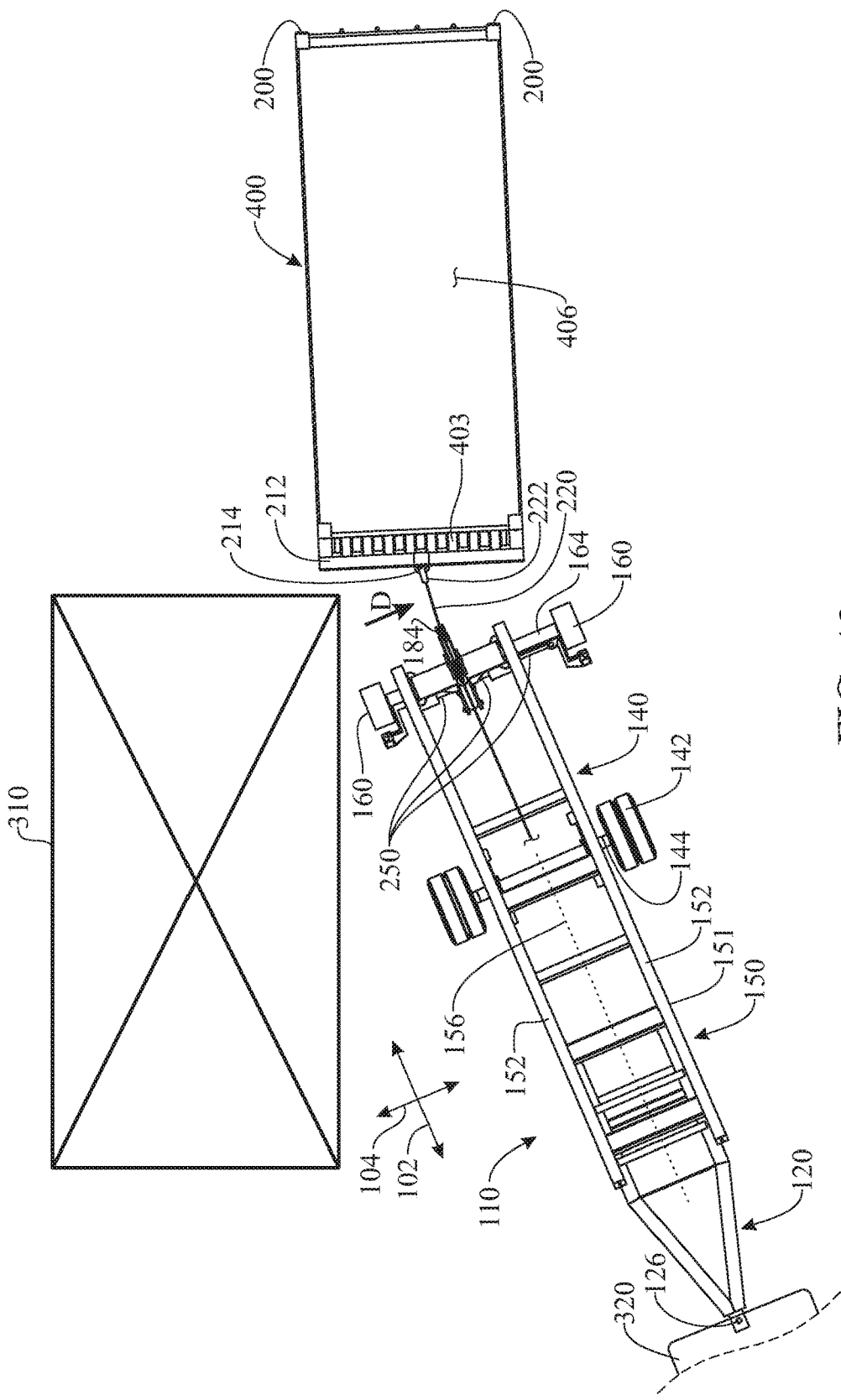
FIG. 12 presents a top plan view of the vehicle trailer system and cargo container of FIG. 10 in a third situation, in which the winch cable has pulled on the cargo container and raised the front end of the cargo container, and the front end of the cargo container has shifted towards the pulley.

Then, as shown in FIG. 11, the user operates the controls of the vehicle trailer system 100 to expand the hydraulic cylinder 250 in the direction of arrow A (FIG. 8). Due to the elevated friction between the trailer rollers 160 and the ground 300, and to the fact that only the trailer rollers 160 are resting on the ground, expansion of the hydraulic cylinder 250 causes the main body 151 of the pivotable structure 150 (comprising the trailer rails 152 and frame braces 154), the trailer wheels 142, the suspension system 144 and the trailer front structure 120 to shift transversely towards the cargo container 400 as indicated by arrow C (FIG. 1) in a rotational manner, about a generally vertical rotation axis arranged at the trailer hitch coupler 126. In consequence, rear ends of the trailer rails 152 are now more oriented towards the front end wall 403 of the cargo container 400. In summary, the user has partially corrected the initial misalignment by taking advantage of the fact that, when set to the position of FIG. 5, the trailer 110 allows shifting the majority of the pivotable structure 150 laterally while being supported on the ground by the trailer rollers 160. If not having done so previously, the user can now operate the controls of the vehicle trailer system 100 to lift the movable arm 180 to the elevated position of FIG. 7.

From the situation of FIG. 11, the user can proceed to operate the controls of the vehicle trailer system winch to pull on the winch cable 220, which in turn pulls on the fastener 214. Sufficient pulling causes the front end of the cargo container 400 to be lifted off the ground while the cargo container rollers 200 remain on the ground. As understood from FIG. 11, in the instant moment when the front end of the cargo container 400 is lifted off the ground, the cable portion extending from the pulley 184 of the elevated movable arm 180 to the fastener 214 is still oblique, oblique understood as forming an angle with the longitudinal direction 102, and the hook 222 and fastener 214 are offset from a vertical longitudinal plane 156 encompassing the pulley 184. Now, because the hook 222 and fastener 214 are offset from the vertical longitudinal plane 156, when the cargo container 400 starts to rise, the winch cable 220 exerts a transverse force, i.e. in the direction of arrow D or having a component in the direction of arrow D, on the fastener 214. Thus, as soon as the front end of the cargo container 400 lifts off the ground, the unaligned, suspended front end of the cargo container 400 tends to rotate towards the central vertical longitudinal plane 156 due to gravity and assisted by the rear cargo container rollers 200. Continued operation of the winch and continued exertion of the transverse force causes the front end of the cargo container 400 to continue rotating towards the pulley 184 while the rear end of the cargo container 400 can adjust its position by rolling on the cargo container rollers 200. Eventually, the cargo container 400 reaches a position in which the fastener 214, and thus the front end of the cargo container 400, has substantially self-aligned in the longitudinal direction 102 with the movable arm 180 as reflected in FIG. 12. Thus, the front lifting of the cargo container 400 from a winch cable 220 or other flexible elongated item (e.g., a chain) combined with one or more rear bottom rollers attached to the cargo container 400 is able to provide an automatic alignment correction of the cargo container 400 when lifted.

Figure 13:
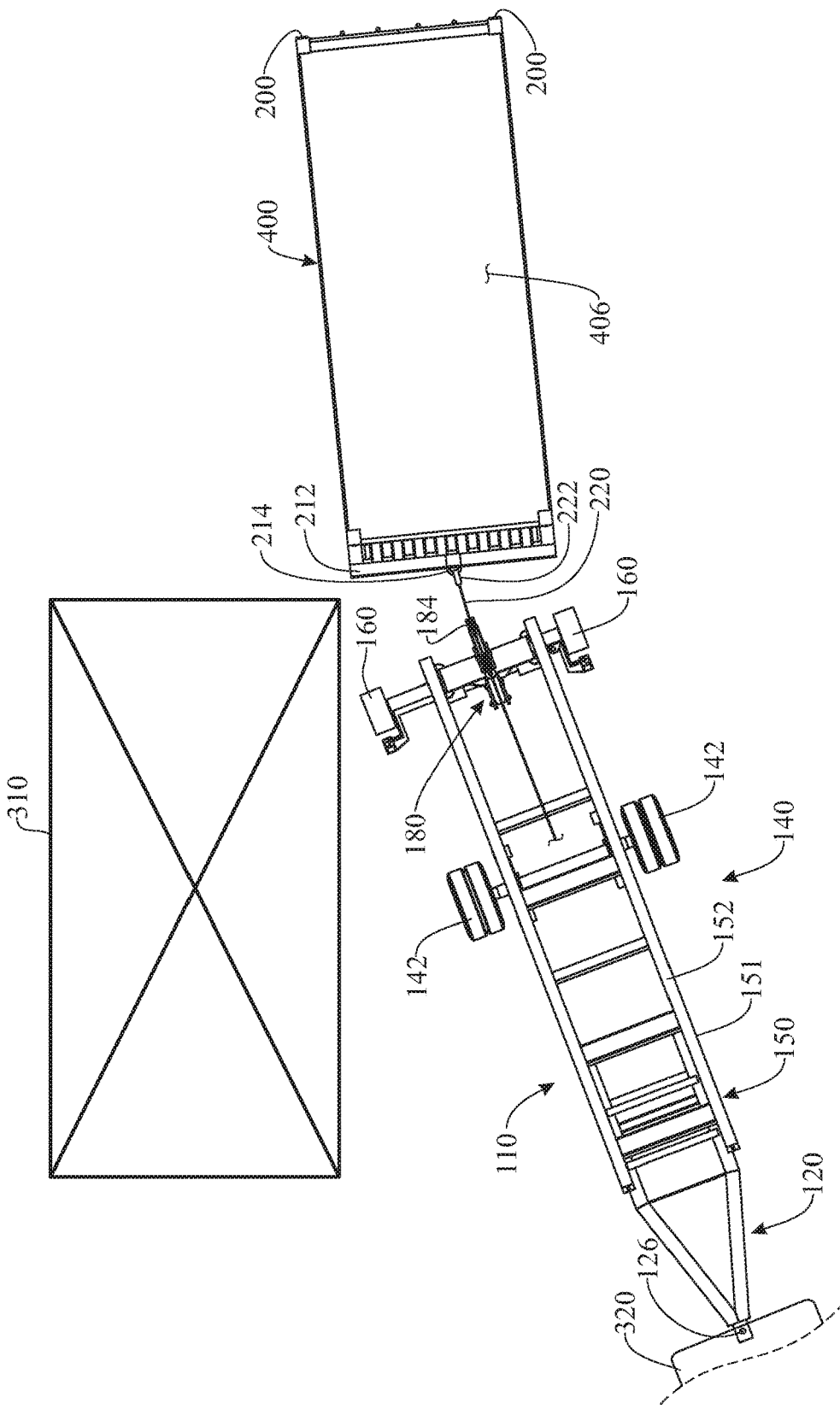
FIG. 13 presents a top plan view of the vehicle trailer system and cargo container of FIG. 10 in a fourth situation, in which the main body of the pivotable structure has been shifted transversely away from the obstacle, thus shifting the front end of the cargo container along with it and increasing alignment between the cargo container and the trailer.

In a subsequent step, as shown in FIG. 13, the user operates the vehicle trailer system 100 to compress the hydraulic cylinder 250 in the direction of arrow B (FIG. 9). Due to the elevated friction between the trailer rollers 160 and the ground 300, and to the fact that only the trailer rollers 160 are resting on the ground, compression of the hydraulic cylinder 250 causes the main body 151 of the pivotable structure 150 (comprising the trailer rails 152 and frame braces 154), the trailer wheels 142, the suspension system 144 and the trailer front structure 120 to shift transversely away from the obstacle 310 and, more specifically, to rotate away from the obstacle 310 (while the trailer rollers 160 remain on the ground 300) about a generally vertical rotation axis arranged at the trailer hitch coupler 126. Because the movable arm 180 is supported on the main body 151, the pulley 184 also shifts transversely away from the obstacle 310; in consequence, the front end of the cargo container 400 once more shifts due to gravity to stay aligned with the movable arm 180. As shown, the segment of the winch cable 220 extending from the pulley 184 to the fastener 214 is now (FIG. 13) closer to being arranged in the longitudinal direction 102 than in FIG. 12, and rear ends of the trailer rails 152 are now more oriented towards the front side of the cargo container 400, and the cargo container 400 is thus significantly more aligned with the trailer 110. It can also be appreciated that, in just a few simple operations or steps, the cargo container 400 has been shifted away and misaligned from the obstacle 310 and now clears the obstacle 310.

Figure 14:
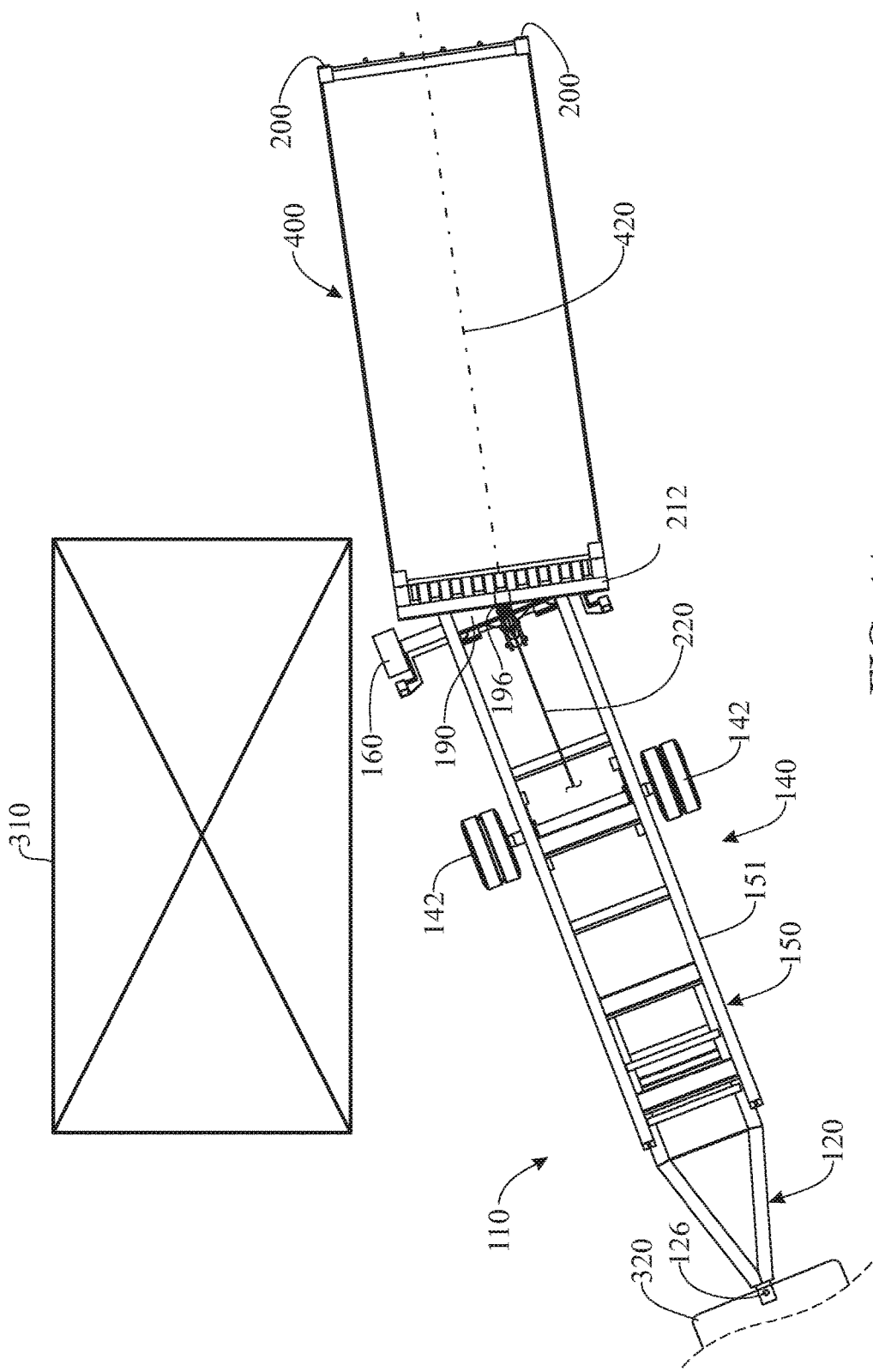
FIG. 14 presents a top plan view of the vehicle trailer system and cargo container of FIG. 10 in a fifth situation, in which the hitch structure attached to the bottom of the front end of the cargo container has been coupled to the carriage hitch of the carriage body, and the movable arm has been pivoted to a lowermost position.

Having cleared the obstacle 310, the user proceeds to operate the vehicle trailer system 100 to further pull the winch cable 220. The front end of the cargo container 400 is further lifted in the air by pulling and retreating of the winch cable 220 along the pulley 184 of the elevated movable arm 180. Lifting of the front end of the cargo container 400 causes the cargo container rollers 200 to roll on the ground 300 and the cargo container 400 to thus translate forward towards the trailer 110. Once the front end of cargo container 400 is sufficiently elevated and closed up to the trailer 110, the user reverses operation of the vehicle trailer system 100 to controllably unwind the winch cable 220. The front end of the cargo container 400 thus controllably descends and eventually is set to rest on, and couple to, the rear end of the pivotable structure 150 of the trailer rear structure 140 as shown in FIG. 14; more specifically, the hitch structure 212 attached to the cargo container 400 is coupled to the carriage 190 of the pivotable structure 150 by having the cargo container hitch coupler 210 engage with the ball-shaped carriage hitch 196 on the carriage 190. The user then operates the vehicle trailer system 100 to pivot the movable arm 180 towards the lowered position of FIG. 6; in pivoting back, the movable arm 180 disengages from the winch cable 220 and eventually reaches the lowered position of FIG. 6. The user also operates the vehicle trailer system 100 to pivot the pivotable structure 150 and the trailer front structure 120 to the position of FIG. 4. Thus, the cargo container 400 reaches a situation shown in FIG. 17, in which its weight is supported on the ground 300, via the cargo container rollers 200, and on the carriage hitch 196 of the carriage 190. In turn, the trailer 110 is supported on the ground 300 by both the trailer wheels 142 and the trailer rollers 160. The movable arm 180 is arranged in a lowermost position in which the carriage 190, if translated along the carriage roller grooves 170, is capable of passing over the folded movable arm 180.

Once the cargo container 400 has been coupled onto the ball-shaped carriage hitch 196 and the movable arm 180 has been lowered of FIG. 6, the user once more operates the winch controls of the vehicle trailer system 100 to pull the winch cable 220. Pulling of the winch cable 220 causes the hook 222 to exert a pulling force on the fastener 214, the pulling force being transferred to the hitch structure 212 and thus to the cargo container 400 and the carriage 190. In consequence, the carriage 190 is caused to translate upward by its carriage rollers 194 rolling along the respective carriage roller grooves 170 of the trailer rails 152. The cargo container 400, coupled to the carriage 190, also translates upward while its cargo container rollers 200 roll on the ground 300 and towards the trailer 110. Continued winding operation of the winch causes the cargo container 400 to be gradually pulled towards and over the trailer 110. Because the front end of the cargo container 400 is coupled to the carriage 190 via a ball-joint (that formed by ball-shaped carriage hitch 196 and cargo container hitch coupler 210), as the cargo container 400 is pulled forward the front end of the cargo container 400 is allowed to rotate relative to the carriage 190 and the trailer rear structure 140. In consequence, the angle formed by the central longitudinal direction 420 of the cargo container 400 and the winch cable 220 is gradually reduced as the cargo container 400 is pulled by the carriage 190, as can be observed from the transition between the situation of FIG. 14 and the situation of FIG. 15. Thus, the ball-joint coupling of the cargo container 400 to the vehicle trailer system 100 also greatly contributes to align the cargo container 400.

Figure 15:
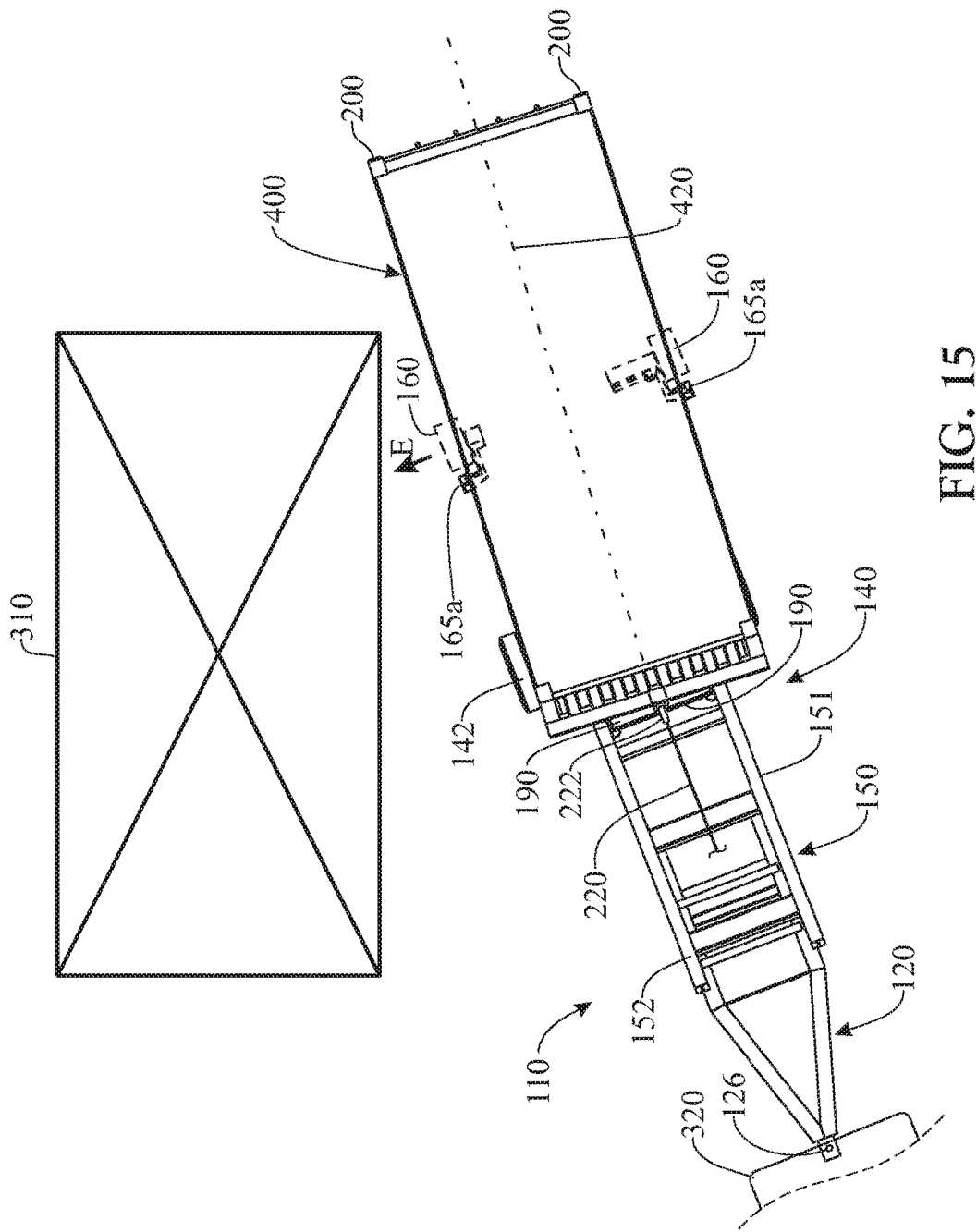
FIG. 15 presents a top plan view of the vehicle trailer system and cargo container of FIG. 10 in a sixth situation, in which the trailer rollers have been shifted away from the obstacle in preparation for the cargo container to pass over them, and in which the winch cable has pulled the cargo container further upward.

As mentioned heretofore, when the cargo container 400 is coupled to the carriage 190, the cargo container 400 rests on the carriage hitch 196 only, and not on the trailer rollers 160. Thus, as can be observed in FIG. 17, when the cargo container 400 begins to be pulled upward, there exists a slight gap between the trailer rollers 160 and the cargo container 400. As the cargo container 400 is pulled upward, the gap gradually decreases. While there still remains a gap between the cargo container 400 and the trailer rollers 160, the user can operate the controls vehicle trailer system 100, currently in the position of FIG. 4, to only slightly lift the trailer rollers 160 off the ground 300, making sure that they do not contact the cargo container 400. Then, the user can operate the controls of the vehicle trailer system 100 to expand the hydraulic cylinder 250 in the direction of arrow A (FIG. 8). Because the trailer rollers 160 are neither contacting the ground 300 nor the cargo container 400, expansion of the hydraulic cylinder 250 causes the rear crossbeam 164, trailer rollers 160, link sections 163 and elevated supports 165 to shift transversely in the direction of arrow A. The user operates the hydraulic cylinder 250 until the trailer rollers 160 are arranged in vertical registration with the cargo container 400, as shown in FIG. 15, and thus better situated for eventually supporting the cargo container 400. In other words, the vehicle trailer system 100 can adopt a position in which the cargo container 400 is supported by the carriage hitch 196 and the cargo container rollers 200, the trailer wheels 142 are supported on the ground, and the trailer rollers 160 can be shifted transversely to adjust their transverse position relative to the cargo container 400.

Once the user has adjusted the transverse position of the trailer rollers 160 so that have increased their vertical registration with the cargo container 400 as shown in FIG. 15, the user then operates the vehicle trailer system 100 to further wind the winch cable 220 and pull the carriage 190 and cargo container 400 forward. As the cargo container 400 translates forward while resting on the carriage hitch 196 and the ground 300 (via the cargo container rollers 200), the gap between the trailer rollers 160 and the cargo container 400 continues to decrease, and eventually the cargo container 400 contacts and starts rolling on the trailer rollers 160. At a certain point, the user then operates the vehicle trailer system 100 to pivot the pivotable structure 150 forward and further lift the trailer rollers 160 from the ground towards the position of FIG. 3; alternatively, when the cargo container 400 has been sufficiently loaded onto the pivotable structure 150 and the center of mass of the cargo container 400 has overcome the trailer wheels 144, the pivotable structure 150 is caused or assisted to rotate forward by the weight of the cargo container 400 towards the position of FIG. 3, thus further lifting the trailer rollers 160 off the ground.

Figure 16:
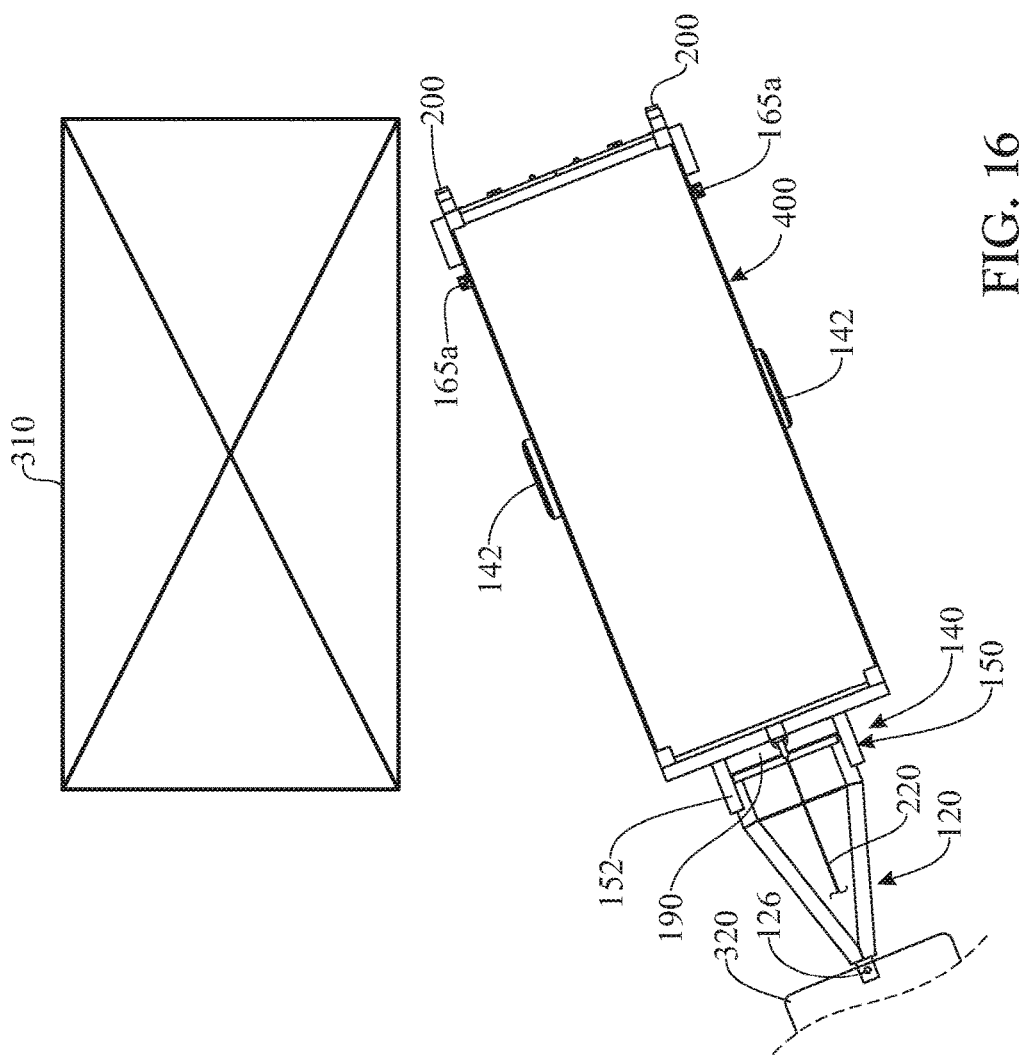
FIG. 16 presents a top plan view of the vehicle trailer system and cargo container of FIG. 10 in a seventh situation, in which the winch cable has pulled the cargo container further upward, the trailer rollers have been shifted transversely towards the obstacle to completely align the cargo container with the trailer, and the cargo container is completely loaded on the trailer.
Figure 17:
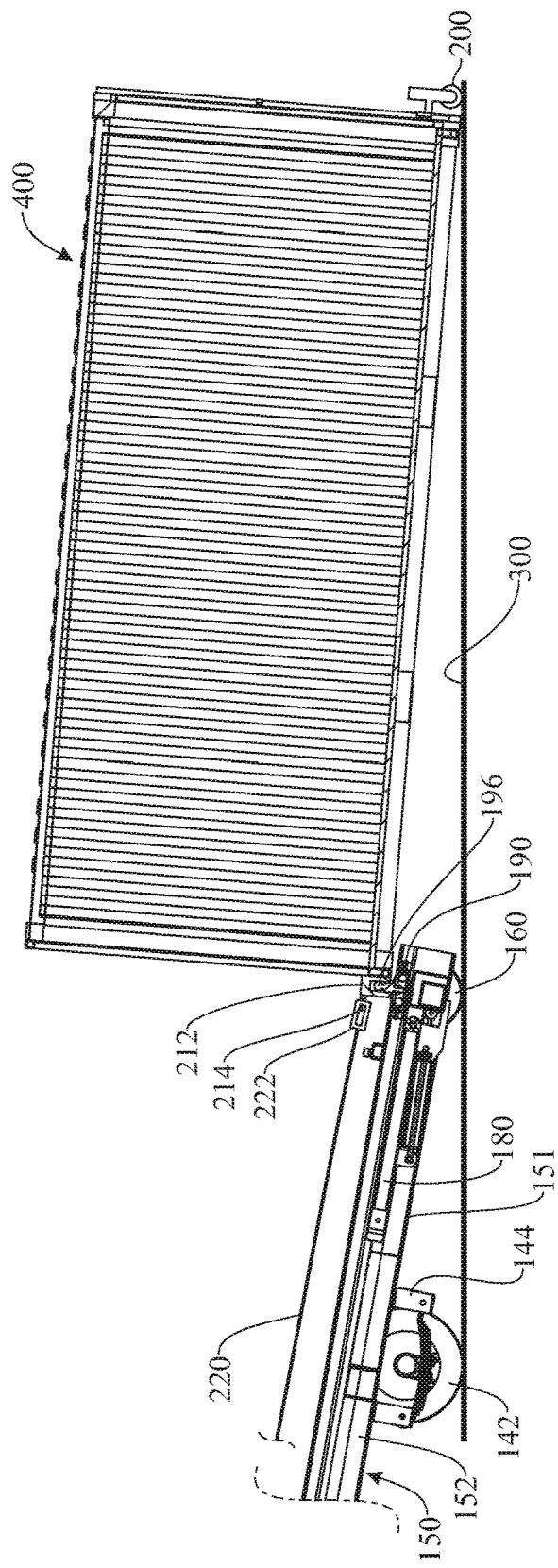
FIG. 17 presents a cross-sectional side elevation view of the trailer and cargo container in the situation of FIG. 14.
Figure 18:
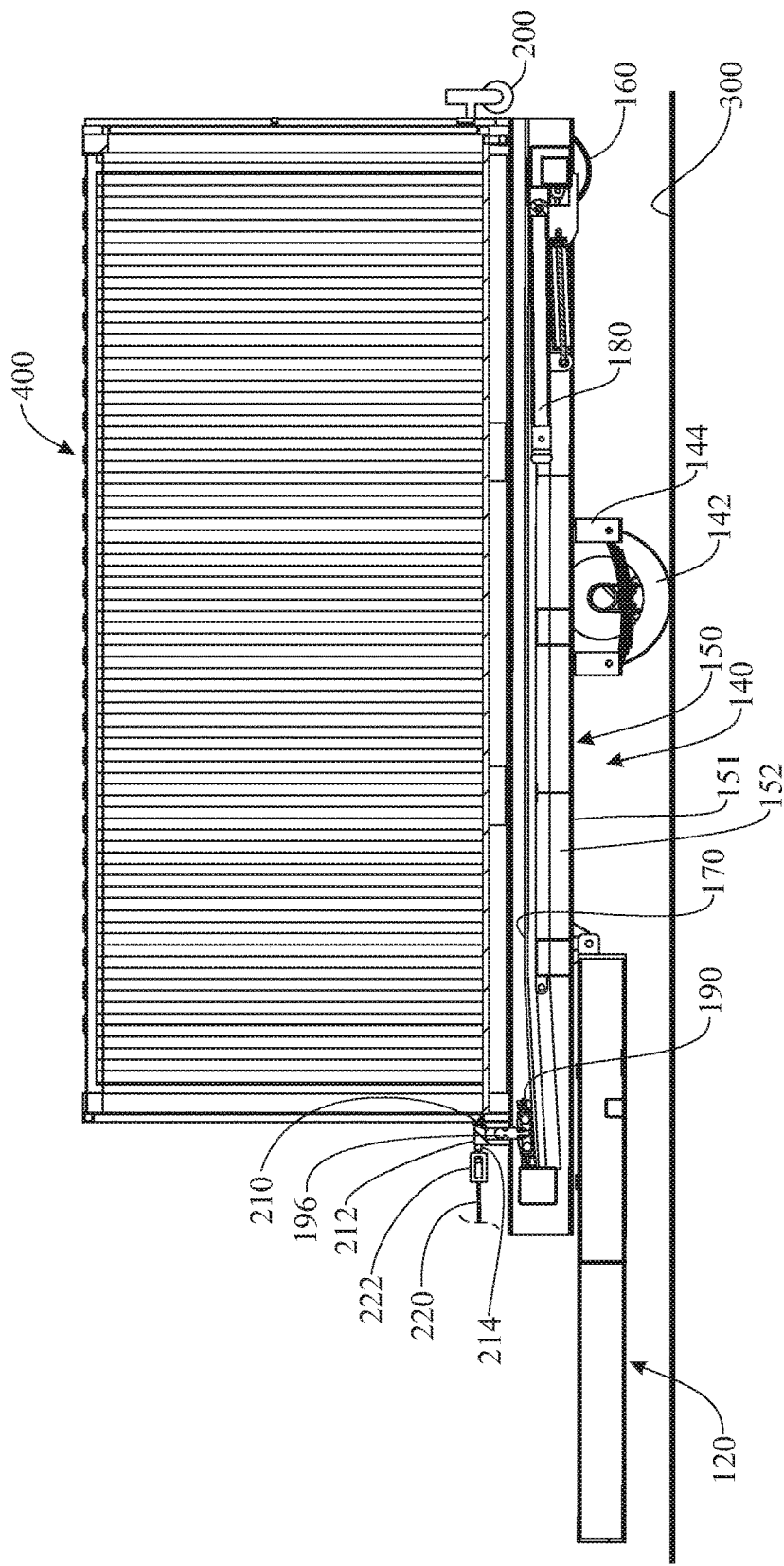
FIG. 18 presents a side elevation view of the vehicle trailer system and the cargo container in the completely loaded situation of FIG. 16.

Once the trailer rollers 160 are off the ground 300 and the cargo container 400 is supported on the trailer rollers 160 and on the carriage hitch 196, the user can further adjust the transverse position of the cargo container 400 by operating the vehicle trailer system 100 to move the trailer rollers 160 transversely; in moving transversely, the trailer rollers 160 "carry" the cargo container 400 sideways. In other words, from the situation of FIG. 15, in which the cargo container 400 is still slightly forming an angle with the longitudinal direction 102 of the trailer 110, the user can further operate the vehicle trailer system 100 to compress the hydraulic cylinder 250 in the direction of arrow B (FIG. 9). In consequence, the rear crossbeam 164, link sections 163, elevated supports 165 and trailer rollers 160, and the cargo container 400 (supported by the trailer rollers 160) are shifted transversely in the direction of arrow E (FIG. 15), generally about an axis of rotation at the ball-joint connection provided by the coupled carriage hitch 196 and cargo container hitch coupler 210. The user operates the hydraulic cylinder 250 until the cargo container 400 is longitudinally aligned with the pivotable structure 150 of the trailer rear structure 140. Either during or after operation of the hydraulic cylinder 250, the user operates the vehicle trailer system 100 to further wind the winch cable 220 and cause the cargo container 400 to be pulled further onto the pivotable structure 150. The adjustable stops 165a, which have been previously adjusted by the user by inserting them in the most appropriate receiving hole 165b, help guide the cargo container 400 onto the pivotable structure 150. After sufficient winding of the winch cable 220, the cargo container 400 reaches a loaded, aligned position as depicted in FIGS. 16 and 18. In the final position, the cargo container 400 may or may not also rest on the trailer rails 152 of the pivotable structure 150.

Unloading the cargo container 400 can be achieved, for instance, by carrying out the exact opposite sequence as described heretofore.

As has been demonstrated, by means of the transverse-shifting rear trailer rollers 160, the vehicle trailer system 100 of the present embodiment is extremely effective in loading and unloading a misaligned cargo container 400 and in sorting any obstacles that make it impossible to drag the cargo container 400 onto conventional container-transporting trailers in which the cargo container is dragged onto a tilted trailer bed. The vehicle trailer system 100 replaces an entire dragging process, as taught in prior art, with a loading process in which the cargo container 400 is initially vertically lifted and coupled to the trailer 110 (to the carriage hitch 196) in an initial semi-loaded position (FIG. 17), thereby reducing the length of the trailer 110 needed to achieve this initial semi-loaded position in comparison to container-dragging trailers known in the art. In addition, by having the cargo container 400 first lifted, then supported initially by the rear cargo container rollers 200 and the carriage hitch 196, and then supported by the trailer rollers 160 and the carriage hitch 196, loading of the cargo container 400 onto the trailer 110 is carried out with minimum friction between the cargo container 400 and the trailer 110 in comparison to conventional trailers in which the cargo container is dragged onto a trailer bed.

Alternative embodiments are contemplated in addition to the embodiment depicted herein. In some embodiments, the lifting mechanism can be other than a pivoting movable arm 180. For instance, the lifting mechanism can be a forklift or crane provided on the trailer 110. In other embodiments, the lifting mechanism may not form part of the vehicle trailer system 100, but rather take the form of an external conventional lifting mechanism such as, but not limited to, an external forklift or crane supported on the ground capable of raising and descending the cargo container 400 onto the carriage hitch 196 to reach the initial situation of FIG. 17.

In addition, in some embodiments, any of the actuators described heretofore can alternatively or additionally include a non-hydraulic actuator such as, but not limited to, an electrical or pneumatic actuator.

It is also contemplated that the vehicle trailer system can present alternative reduced-friction elements to the rollers 160 depicted herein, which are configured to support the cargo container 400 from beneath. For instance, the vehicle trailer system can include a pair of rollers, one on each side of the rear crossbeam 164, configured to roll within and along a longitudinal recessed channel comprised in a bottom area of the left and right side of a cargo container as known in the art; when rolling through the channel, a ceiling of the channel contacts the respective roller, and the rollers thus support the weight of the cargo container and cargo. In other embodiments, the rear crossbeam 164 can include, instead of rollers 160, two opposite end low-friction surfaces that are oriented upwardly for the cargo container or other load to slide upon; for instance and without limitation, the low-friction surfaces can be provide by ultra-high molecular weight polyethylene (UHMW) sheets, configured to support the cargo container and offer a low resistance to the cargo container sliding longitudinally thereupon.

Alternative embodiments are also contemplated in which there are no cargo container rollers 200, or in which no cargo container rollers 200 are attached to the cargo container, skid floor, flat bed or other cargo-supporting structure. For instance, in some embodiments, the rear bottom end of the cargo container, skid floor, flat bed or other cargo-supporting structure may directly contact the ground 300. Such alternative is applicable, for instance and without limitation, when the cargo-supporting structure is resting on muddy ground and the bottom rear end of the cargo-supporting structure is capable of sliding on the muddy ground as the front end of the cargo-supporting structure is lifted and pulled by the winch cable (similarly to FIG. 14).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A vehicle trailer system for loading, transporting and unloading a load, comprising a trailer including:
 a trailer front structure;
 a pivotable structure arranged rearward of the trailer front structure and pivotably attached to the trailer front structure, the pivotable structure comprising:
  an elongated main body extending along a front-to-back, longitudinal direction,
  a transversely-movable structure carried by the elongated main body at a rear end thereof, the transversely-movable structure selectively movable relative to the elongated main body in a side-to-side, transverse direction perpendicular to the longitudinal direction; wherein two opposite side portions of the transversely-movable structure extend outwardly from two opposite transverse sides of the elongated main body, respectively; and
 a set of wheels coupled to the pivotable structure and arranged frontward of the transversely-movable structure; wherein
 the trailer is movable to adopt:
  a first configuration, in which the pivotable structure is supported on a surface by the set of wheels and the transversely-movable structure is in the air; and
  a second configuration, in which the pivotable structure is pivoted rearward relative to the first configuration, the set of wheels is in the air, and the pivotable structure is supported on the surface by the transversely-movable structure.

2. The vehicle trailer system of claim 1, wherein the pivotable structure is pivotable in relation to the trailer front structure about a rotation axis arranged along the transverse direction.

3. The vehicle trailer system of claim 1, wherein the trailer is movable to further adopt a third configuration, in which the pivotable structure is pivoted rearward relative to the first configuration and forward relative to the second configuration, and in which the pivotable structure is supported on the surface by both the set of wheels and the transversely-movable structure.

4. The vehicle trailer system of claim 1, wherein the pivotable structure further comprises a carriage mounted for bidirectional travel on the elongated main body of the pivotable structure, the carriage comprising a carriage hitch.

5. The vehicle trailer system of claim 4, wherein the carriage hitch is configured for the pivotably coupling thereto of a load.

6. The vehicle trailer system of claim 5, wherein the carriage hitch comprises a hitch ball.

7. The vehicle trailer system of claim 6, wherein the hitch ball protrudes upwardly from the elongated main body.

8. The vehicle trailer system of claim 4, further comprising a hitch structure removably attachable to a load, the hitch structure comprising a hitch coupler for engaging with the carriage hitch, the hitch structure further comprising a fastener for coupling a fastener of a lifting mechanism.

9. The vehicle trailer system of claim 8, further comprising at least one roller removably attachable to the load.

10. The vehicle trailer system of claim 1, the transversely-movable structure further comprising a pair of rollers rotatable about a transverse rotation axis and providing a roller top side for the passing thereon of a load, wherein a respective roller of the pair of rollers is arranged on a respective one of the two opposite side portions of the transversely-movable structure.

11. The vehicle trailer system of claim 1, the transversely-movable structure further comprising a pair of upwardly oriented low-friction surfaces, for the sliding thereon of a load, wherein a respective upwardly oriented low-friction surface of the pair of upwardly oriented low-friction surfaces is arranged on a respective one of the two opposite side portions of the transversely-movable structure.

12. The vehicle trailer system of claim 11, wherein the low-friction surfaces are made of ultra-high molecular weight polyethylene (UHMW).

13. The vehicle trailer system of claim 1, comprising a load-lifting mechanism.

14. The vehicle trailer system of claim 13, wherein the pivotable structure further comprises a carriage mounted for bidirectional travel on the elongated main body of the pivotable structure, the carriage comprising a carriage hitch, and further wherein the load-lifting mechanism is carried by the pivotable structure and is movable to adopt a lowered position in which the carriage can pass over the load-lifting mechanism when traveling on the elongated main body.

15. The vehicle trailer system of claim 1, further comprising a suspension system providing a relative vertical movement between the pivotable structure and the set of wheels.

16. The vehicle trailer system of claim 15, wherein the suspension system further provides a relative transverse movement between the pivotable structure and the trailer wheels.

17. The vehicle trailer system of claim 1, wherein the trailer front structure comprises a trailer hitch coupler for attaching to a hitch carried by a vehicle.

18. A vehicle trailer system for loading, transporting and unloading a load, comprising a trailer including:
   a trailer front structure;
   a pivotable structure arranged rearward of the trailer front structure and pivotably attached to the trailer front structure, the pivotable structure comprising:
      an elongated main body extending along a front-to-back, longitudinal direction,
      a transversely-movable structure carried by the elongated main body at a rear end thereof, the transversely-movable structure selectively movable relative to the elongated main body in a side-to-side, transverse direction perpendicular to the longitudinal direction; wherein two opposite side portions of the transversely-movable structure extend outwardly from two opposite transverse sides of the elongated main body, respectively;
      a carriage mounted for bidirectional travel on the elongated main body of the pivotable structure, the carriage carrying a hitch ball configured for the pivotably coupling thereto of a load; and
   a set of wheels coupled to the pivotable structure and arranged frontward of the transversely-movable structure; wherein
the trailer is movable to adopt:
   a first configuration, in which the pivotable structure is supported on a surface by the set of wheels and the transversely-movable structure is in the air; and
   a second configuration, in which the pivotable structure is pivoted rearward relative to the first configuration, the set of wheels is in the air, and the pivotable structure is supported on the surface by the transversely-movable structure;
the vehicle trailer system further comprising:
   a hitch structure removably attachable to a front end of load, the hitch structure comprising a hitch coupler for engaging with the hitch ball, the hitch structure further comprising a fastener for coupling a fastener of a lifting mechanism, and
   at least one roller removably attachable to a rear end of the load.

* * * * *